(12) United States Patent
Mukherjee

(10) Patent No.: US 12,271,505 B2
(45) Date of Patent: Apr. 8, 2025

(54) SYSTEMS AND METHODS FOR REAL TIME DATA PROTECTION AND INTELLIGENT INPUT/OUTPUT INTERACTION

(71) Applicant: Aveek Kumar Mukherjee, Bangalore (IN)

(72) Inventor: Aveek Kumar Mukherjee, Bangalore (IN)

(*) Notice: Subject to any disclaimer, the term of this patent is extended or adjusted under 35 U.S.C. 154(b) by 0 days.

(21) Appl. No.: 17/123,042

(22) Filed: Dec. 15, 2020

(65) Prior Publication Data

US 2022/0188455 A1 Jun. 16, 2022
US 2023/0093789 A9 Mar. 23, 2023

(30) Foreign Application Priority Data

Oct. 19, 2020 (IN) .............................. 202041045563

(51) Int. Cl.
*G06F 21/62* (2013.01)

(52) U.S. Cl.
CPC ........ *G06F 21/6254* (2013.01); *G06F 21/629* (2013.01)

(58) Field of Classification Search
CPC ............... G06F 21/6254; G06F 21/629; G06F 21/6245; G06F 2221/032
See application file for complete search history.

(56) References Cited

U.S. PATENT DOCUMENTS

| 9,047,485 B2* | 6/2015 | Mastie | G06F 21/6245 |
| 2008/0065665 A1 | 3/2008 | Pomroy et al. | |
| 2015/0135067 A1* | 5/2015 | Ellis | G06F 40/103 715/273 |
| 2016/0239668 A1* | 8/2016 | Bellert | G06F 21/602 |
| 2016/0292441 A1* | 10/2016 | Stuntebeck | G06F 21/6218 |
| 2016/0378999 A1* | 12/2016 | Panchapakesan | G06F 21/6254 726/26 |
| 2017/0192666 A1* | 7/2017 | McCarthy | H04N 5/2621 |
| 2017/0249466 A1* | 8/2017 | Ben-Yair | G06F 21/6254 |
| 2018/0049023 A1* | 2/2018 | Stuber | G06F 9/452 |
| 2020/0104539 A1* | 4/2020 | Liu | G06F 21/6245 |
| 2021/0182438 A1* | 6/2021 | Huitt | G06F 21/84 |
| 2021/0312080 A1* | 10/2021 | Ramamurthy | G06F 21/6245 |
| 2022/0012357 A1* | 1/2022 | Rajeev | G06F 40/279 |

FOREIGN PATENT DOCUMENTS

WO WO-2020046274 A1 * 3/2020 ......... G06F 21/6245

OTHER PUBLICATIONS

Indian Application No. 202041045563, Examination Report mailed Jan. 11, 2023, 6 pages.

* cited by examiner

*Primary Examiner* — Carl G Colin
*Assistant Examiner* — Andrew Suh
(74) *Attorney, Agent, or Firm* — Brentwood IP Law, P.C.; Shahrooz Isaac Zaghi

(57) ABSTRACT

Systems and methods for protecting and interacting with data in real time are described by the disclosed subject matter. A method includes monitoring a presentation of data by an application on a display and determining that a portion of the data is restricted. The method includes asking, in real time, the presentation of the portion of the data that is restricted.

17 Claims, 14 Drawing Sheets

SYSTEMS AND METHODS FOR REAL TIME DATA PROTECTION AND INTELLIGENT INPUT/OUTPUT INTERACTION

FIELD OF THE INVENTION

This disclosure relates to the rule based fields of data monitoring, masking, and reporting data in applications.

BACKGROUND

Data may be categorized as confidential, restricted, classified, etc., which indicates that the data cannot be shared with individuals that are not authorized to view the data. Examples of confidential data may be personally identifiable information related to health-related information. Another example of confidential data is company trade secret information. Other examples of confidential data may be military secrets or research that is deemed a threat to national security. Data restrictions may be enforced by regulations, contractual obligations, etc.

Over time, increasing amounts of data are produced and a portion of that increasing volume of data is categorized as confidential in one way or another. Records displayed on system screens may be completely confidential or may be unrestricted but for bits and pieces of confidential data within the specific record on the system screen. As more and more data is deemed confidential, the number of individuals that must be authorized to view the confidential or restricted data also needs to be increased. Organizations may face a complicated problem of how of keep data restricted, but allow screens/records that contain confidential information to be processed as part of ordinary business. Organizations that handle copious amounts of confidential data may be forced to authorize a large portion of their employees to process records on system screens with confidential data in an effort to handle the problem. There is a need for a rule based monitoring system that automatically restricts the presentation of confidential data on system screens based on the data access allowed for the operator for that specific record on the system screen. In typical applications, restrictions are not placed by record or information level. For example, some operators will be able to view all details for some customer sets like a retail customer and will have restricted view for large corporate type customers. If a filter is unable to be applied, the records can be viewed by all operators. However, the proposed monitoring system can restrict access for the specific operator (or specific group of operators) at the record level or at the level of specific data items within the record (like SSN, DoB, Credit Card PIN, etc.)

SUMMARY

The disclosed subject matter describes methods and systems for protecting and interacting with data in real time. In an exemplary embodiment, a method comprises monitoring a presentation of data by an application on a display and determining that a portion of the data is restricted. The method comprises masking, in real time, the presentation of the portion of the data that is restricted. The method may further comprise nullifying user actions that target the portion of the data that is restricted. The method may further comprise checking display level interactions to determine that nullifying user actions that target the portion of the data does not break a functioning of the application. The masking may allow the application to function normally while the portion of the data is masked. Determining that a portion of the data is restricted may include identifying one or more users that are viewing the portion of the data by collecting biometric data of the one or more users with one or more sensors and determining that at least one or more users is restricted from viewing the portion of the data. Determining that the portion of the data is restricted may include identifying one or more monitoring devices that can view the portion of the data and determining that at least one of the one or more monitoring devices is not authorized to view the portion of the data. Identities of the one or more users may be updated in real time and determining that a portion of the data is restricted may include determining a restriction level for each of the one or more users and updating the portion of the data that is restricted based on a highest restriction level of the one or more users.

Another general aspect is an electronic device. The electronic device includes a display configured to draw frames containing data elements of an application running within an operating system and a processor configured to run the operating system and transmit the frames to the display to be drawn. The processor is further configured to monitor data that is transmitted to the display, determine that a portion of the data is restricted, and mask, in real time, the portion of the data that is restricted. The processor may be further configured to nullify user actions that target the portion of the data that is restricted where the processor is further configured to check display level interactions to determine whether user actions, which target the portion of the data and are nullified, do not break a functioning of the application. The electronic device may include one or more sensors that collect image data where the processor is further configured to identify one or more monitoring devices that can view the portion of the data and determine that at least one of the one or more monitoring devices is not authorized to view the portion of the data. The processor may be further configured to allow the application to function normally while the portion of the data is masked. The electronic device may include one or more sensors that collect biometric data where the processor is further configured to identify one or more users that are viewing the portion of the data based on the biometric data and determine that at least one of the one or more users is restricted from viewing the portion of the data. The identities of the one or more users may be updated in real time where the processor is further configured to determine a restriction level for each of the one or more users and update the portion of the data that is restricted based on a highest restriction level of the one or more users.

Another general aspect is a method. The method includes evaluating one or more rules in a ruleset for manipulation of data on a computer device and identifying a location of the data, on the computer device, based on the ruleset. The method includes manipulating the data based on the ruleset. The method may further include navigating to the location of the data. Navigating may include opening one or more applications. Navigating may further include interacting with one or more screen elements of the one or more applications. Navigating may include selecting a field on a screen of an application and entering the data in the field. Navigating may include selecting a field on a screen of an application and extracting the data from the field. The method may further include identifying one or more monitoring devices that can view the data where manipulating includes hiding the data from the one or more monitoring devices. The method to locate the data and elements is implemented real time on the application like how a human would interpret the screen and the manipulation of data is either automated or operator assisted.

BRIEF DESCRIPTION OF THE DRAWINGS

FIG. 10 is an illustration of a screen of an application that may be protected by a real time data protection and intelligent interaction system.

FIG. 11 is an illustration of a screen of an application where restricted fields have been masked with blocks.

FIG. 12 is an illustration of a screen of an application where restricted fields have been masked by deletion.

DETAILED DESCRIPTION

Figure 1:
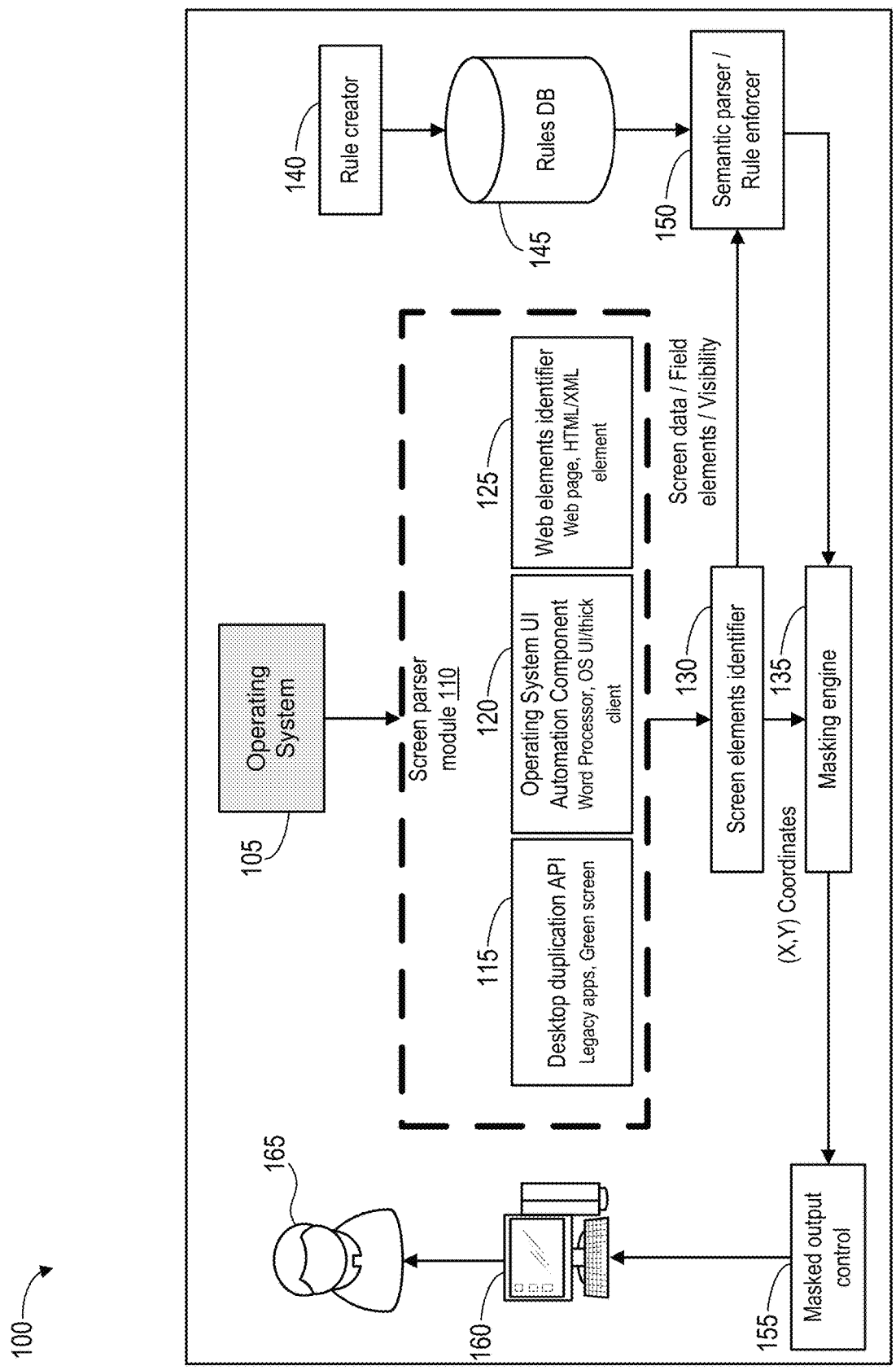
FIG. 1 is an illustration of a schematic of a real time data protection and intelligent interaction system in accordance with the described implementation.

The disclosed subject matter is a system of protecting the output of data to prevent the disclosure of confidential data to restricted individuals. The system may also automatically interact with data similar to the way a person would The system may evaluate a display of an operating system in real time to determine whether any of the data on the display is confidential. The confidential data may be masked such that the restricted individual, who is viewing the display, may not see the confidential data.

The system may screen an output of an application to determine whether the output contains information that should be restricted. A screen parser may use multiple techniques to identify screen elements and data including word processing documents and spread sheets. The screen parser may look for screen objects as identifiable objects in an operating system. In cases where screen objects are not identifiable as screen objects, the system may analyze images of the screen and use optical character recognition to identify field and data elements.

The system may analyze a screen and determine a location of elements on the screen in real time. The system may also identify data in the elements. Further, the system may provide the location of elements as well as the data contained in the elements to a rule enforcer module to identify the fields.

The rule enforcer module may apply artificial intelligence/semantics to identify fields that may be masked. A rule database may be used as a basis for fields that are identified to be masked. For example, a rule database may list a social security number as a field that should be masked. The semantic parser may determine that a data display of "SSN," "Customer SSN," or "Cust. SSN" refers to a social security number.

A masking engine may apply masking to an output based on an identification of data to be masked and a screen location of the data. Data may be masked by covering the data with a visible box or by eliminating the data from the screen. The masking engine may provide a masked output for end user consumption, which may include a final screen output. In addition to the final output screen, the masked output may include object controls. The object controls may determine access to object like data fields, buttons, tabs, links, etc. within the masked area to be controlled. Input actions such as keyboard input and a mouse pointer may be locked when a mouse pointer or cursor is moved to the mask location on the screen. Thus, the mask output disallows selection and copy actions of the masked area.

In an exemplary embodiment, the masking engine may restrict data on three levels, which are the application, records, and data fields. Application level restriction may relate to the restriction of entire applications. For example, the masking engine may restrict a user from opening an application. In another example, the masking engine may prevent a user from operating one or more functions of an application. In one implementation, the masking engine may prevent the use of a function that opens personally identifiable information in an application. In another implementation, the masking engine may force an application to close when the masking engine detects that an unauthorized viewing is taking place, such as when an individual, who is unauthorized, moves within viewing distance of a display screen.

Record level restriction may be employed by the masking engine to mask various records in a database. For instance, an organization may attach a classification level to records that are stored within the organization. Individuals may be restricted from viewing the records based on the clearance level of the individual. The masking engine may automatically restrict records from individuals that do not have the clearance to view the records. In one implementation, the masking engine may black out data from records that are restricted. In another implementation, the masking engine may prevent the opening of a record that is restricted. In yet another implementation, the masking engine may force an application to close upon the opening of a restricted record.

Data field restriction may be evoked by the masking engine to restrict individual data values on a screen. In one example, various personally identifiable information fields may be masked while leaving other fields to be displayed normally. In an implementation of the example, a social security number and a name of a patient are masked on a screen while other information in a patient record such as age, height, and weight are left to be displayed.

In addition to monitoring the use of an application and interrupting the use of an application, the system may be configured to automatically enter data into the fields of an application. The system may perform the same actions that a human individual would perform to enter data into an application. The system may further automatically navigate the screens of an application and interact with various screen elements of the application. Further, the system may be configured to automatically initiate one or more applications. Thus, the system may be configured to automatically start an application, navigate the screens of the application, and enter or extract data from the application.

Applications that are required to be masked to protect confidential data may be run under a separate container to enable overlay of the masking. The container may prevent certain commands such as Ctrl C/V type operation, or applications level shortcuts/commands, screen printing, etc. The mask container may also segregate rule enforcement. For instance, a set of rules may mask data at one restriction level while a second set of restriction rules may mask data at a second restriction level.

A windowed application may preview materials of the container and run the masking rules to ensure that output of an application is masked. In various embodiments, a layer may sit as a driver on an output memory to parse and mask data fields with logic for data protection.

A restriction level may be dependent on an identification of one or more users of the application. The one or more users may be identified with biometric sensors. In one example, a biometric sensor may identify users from camera images. A facial recognition algorithm may be employed to identify the one or more users in real time. The restriction level may adapt to the identification of the one or more users. For example, the sudden appearance of a second user, for whom the restriction level is higher than a first user, may result in a change of the restriction level of the system. A higher restriction level may result in a broader range of rules that classify data as restricted.

Referring to FIG. 1, FIG. 1 is an illustration of a schematic of the real time data protection and intelligent interaction system 100 in accordance with the described implementation. The real time data protection and intelligent interaction system 100 may monitor an output of an application to determine if the output includes restricted data. A level of masking may be dependent on a restriction level of a user 165 of the application.

The real time data protection and intelligent interaction system 100 may function as a layer in an operating system 105 such as Windows, Linux, or Mac OS. The operating system may contain various functions that allow programs to monitor the output of various applications. In an exemplary embodiment, the operating system 105 contains an application program interface ("API") with functions that allow programs to monitor input devices such as a keyboard and a mouse. A layer that acts as a container for masked applications may be created within the operating system 105. Functions in an operating system 105 API may allow a program to control output of application windows and input into application windows. Further, functions of the operating system 105 may allow a program to modify the output and input therein.

The real time data protection and intelligent interaction system 100 may monitor the output of one or more applications in a window of the operating system 105. The system may monitor data that is directed to output in the window. A monitoring layer may contain the one or more application windows that are monitored by a screen parser module 110. The screen parser module 110 may include a Desktop duplication API 115, an Operating System UI, Automation Component 120, and a Web elements identifier 125. The screen parser module 110 may monitor the output of the one or more applications on the operating system 105 to convert the output into one or more screen elements. A purpose of the screen parser module 110 is to package information in an output window such that the information may be processed by various modules and components of the real time data protection and intelligent interaction system 100.

The screen parser module 110 may attempt to read the content that an application attempts to display in a window. Content may be broken up into various elements that can be analyzed for restricted content. Content that is not immediately identifiable as text may be further analyzed to determine whether text or other data is incorporated into the content. In various embodiments, the screen parser module 110 may determine characters of text through optical character recognition ("OCR"). An OCR function may convert images or documents without embedded text into textual data.

The desktop duplication API 115 may include functions of the operating system 105 that, when executed, may provide access to frame-by-frame updates to one or more windows in the operating system 105. For example, the desktop duplication API 115 may include one or more functions that return an image of a windowed application. The desktop duplication API may include functions that return a text that is displayed by an application. Operations of other functions of the desktop duplication API may include, but are not limited to: returning variables that are displayed in an application, returning a portion of a window that is being displayed, returning a location of a mouse pointer, returning keystroke input from a keyboard, and returning audio output of an application. The desktop duplication API 115 may include functions that return updated values of every frame that is drawn on a display. Thus, the desktop duplication API 115 may provide all information of data that is displayed to a user 165 in an application that runs in the operating system 105.

The operating system UI, automation component 120 may include functions that provide access to user interface ("UI") elements in a windowed application. Functions of the operating system UI, automation component 120, when executed, may manipulate an output of an application on the operating system 105. For example, a function may be used to prevent the display of text in a frame of an application. Functions may change the text, block the text, or erase the text. In various implementations, the operating system UI, automation component 120 may block the presentation of elements that have been identified as confidential or restricted. In another implementation, a function may prevent a pointer from moving over an area of a screen that contains restricted data. In another implementation, a function may prevent input from a keyboard from being reproduced on an application. For example, the operating system UI, automation component 120 may prevent a user 165 from using keyboard copy and paste commands to copy data in an application that is restricted. In various embodiments, restricted data may be displayed on a screen, but not be copied.

In various embodiments, the operating system UI, automation component 120 may mask a display screen at the output level. An application may still access field objects that are being hidden from the user on the display screen. The application may thus retrieve a true value of field objects and operate on them without the user being able to see or access the field objects.

In an exemplary embodiment, system system/application interrupts may restrict the actions of the user of the system or application. For example, the user may be prevented from accessing parts of an application by an interrupt or the user may be prevented from opening an application altogether.

Further, the memory buffer may be cleared to prevent a user from accessing restricted data.

The web elements identifier 125 may include functions that can identify data in a web browser or other application that accesses information on the world wide web. In various embodiments, the web elements identifier 125 may identify elements of HTML or XML code in a web page. The identified elements may be processed by the real time data protection and intelligent interaction system 100 to determine if they contain restricted data. In various embodiments, the web elements identifier 125 may contain functions that manipulate the display of elements of a web page. For example, a function may block the display of data associated with a restricted HTML tag.

The screen elements identifier 130 may process elements that were determined by the screen parser module 110. For example, the screen elements identifier 130 may determine a location of elements that are displayed in an application. Those elements that are subsequently determined to be restricted may be blocked at the location given by the screen elements identifier 130. Data within the elements may be passed to the semantic parser 150 (rule enforcer). The semantic parser 150 may determine whether data in the elements that were passed from the screen elements identifier 130 are confidential or restricted. Elements that are determined to be restricted may be masked by the real time data protection and intelligent interaction system 100.

The semantic parser 150 may process elements with rules from a rules database 145. The rules database may contain one or more rules that are used to determine whether the data in elements of an application are restricted. For example, a rule may indicate that digits of text following the term "medical record number" may be restricted. Similarly, variations of the term "medical record number" such as "MRN" or "medical number" or "medical record no." may be incorporated into the rules. The rules database 145 may determine the actions taken to mask data that is restricted. For example, the rules database 145 may determine the restricted data should be masked from view of the user 165. In another example, the rules database 145 may determine that the restricted data should not be selected or copied by the user 165. The rules database may have multiple tiers of rules. For example, a first restricted tier set of rules may prevent a user 165 from viewing or copying or selecting restricted data. A second restricted tier set of rules may allow the restricted data to be viewed, but not be selected or copied. A third restricted tier set of rules may allow the restricted data to be viewed, copied, and selected, or the default, unrestricted state.

Various tiers that are used by the rules database may be determined by a restriction level of a user 165 of the application. A first individual may have a first level clearance that allows the first individual to view restricted data, but not copy restricted data. A second individual may have a second level clearance that allows the second individual to view and copy the restricted data. The third individual may have no clearance whereby the third individual may not view or copy any restricted data.

In various embodiments, tiers of the rules database may contain different sets of rules. In one implementation, a first tier set of rules contains an inclusive set of all rules in the rules database 145. A second tier set of rules contains a subset of the rules that are in the first tier, which may result in fewer rules being checked for the second tier. A third tier set of rules contains a subset of the rules that are in the second tier. Thus, the third tier set of rules may contain the fewest rules. In an exemplary embodiment, a user 165 that has no security clearance may be subjected to masking based on the first set of rules. A user 165 that has a first level security clearance may be subjected to masking based on the second set of rules, which may be a subset of the first set of rules. And a user 165 that has a third level security clearance may be subjected to masking based on the third set of rules.

The set of rules that are used by the semantic parser 150 may be determined based on an identity of the user 165 of the application. If there are more than one user 165 for an application, the semantic parser 150 may select a set of rules from the rules database 145 based on the user 165 with the lowest security clearance. Alternatively, the semantic parser 150 may select a set of rules based on the user 165 with the highest security clearance.

A set of rules may be dependent on a type of user. For instance, a set of rules may be based on whether a user is licensed or unlicensed. In one implementation, a licensed user will not have as many restrictions as an unlicensed user. In another instance, a set of rules may be based on whether a user is an adult or a child. A set of rules may be determined based on the age of the user. In one embodiment, the age of the user is determined by identifying the user through facial recognition and associating an age with the identity of the user. In yet another instance, a set of rules may be based on the location of the user. A location may be a geographic location. In an exemplary embodiment, a user in a work location is given a set of rules that is different from the same user at an away-from-work location. Various user types may be used separately or in combination to determine a set of rules. For example, a first set of rules may be applied for (1) licensed users AND are at a (2) work location. A second set of rules are applied to users that are either (1) unlicensed OR at an (2) away-from-work location.

A rule creator 140 may produce the rules in the rules database 145. In an exemplary embodiment, the rule creator 140 may produce rules based on criteria that are transmitted to the rule creator 140. For example, the rule creator 140 may receive a command to create rules to check for data that relates to a social security number. The rule creator may create rules that check for variations of the term "social security number", such as "SSN", "social security no.", and "social". The rule creator may also create rules that check for data that matches a format of the criteria. For example, a criteria to check for data relating to a date of birth date may check for numbers that are arranged as dates. In one implementation, a criteria includes the format of a medical record number comprising 8 numerical digits followed by 3 letter digits. The rule creator may create rules that check for variations of typically used medical record number formats.

A masking engine 135 may implement one or more masking operations to mask data elements on a display. The masking engine 135 may create a new masking operation for every frame of an application that is drawn. Functions of the operating system UI automation component 120 may be used by the masking engine to mask data elements. For example, the masking engine 135 may implement functions of the UI, automation component 120 to draw a box over data that was determined to be restricted by the semantic parser 150. The box may be placed at a location determined by the screen elements identifier 130.

The semantic parser 150 and the masking engine 135 may perform an iteration of determining data to be restricted and masking the data for every frame that is drawn of an application. Thus, a masking operation that is performed by the masking engine 135 may shift a location of a box that hides restricted data as a user 165 scales, translates, or rotates a window.

A masked output control 155 may prevent the user 165 from interacting with restricted data. For example, the masked output control 155 may implement functions that prevent a mouse point from moving over a masked area. In one implementation, a mouse pointer is moved to a nearest area that is not masked, responsive to the pointer moving into the masked area. In an exemplary embodiment, the masked output control 155 may implement a function that unselects data that was selected within a masked area. The masked output control 155 may cancel a copy command that was performed on restricted data.

The computer system 160 may display an output that is masked to a user 165. The computer system 160 may include one or more biometric sensors that can identify the user 165. For example, the computer system 160 may include a camera sensor that is configured to identify a user 165 through facial recognition. In various embodiments, the biometric sensor may be configured to identify one or more users 165 as the users 165 move within a range of the computer system 160. The semantic parser 150 may use a set of rules based on a clearance level of the one or more users 165. In an exemplary embodiment, the semantic parser 150 may use a set of rules from the rules database 145 based on the identified user 165 within a range of the computer system 160 with a lowest clearance level. In various embodiments, the biometric sensor may identify a user 165 based on fingerprint scans, eye scans, or voice recognition.

Figure 2:
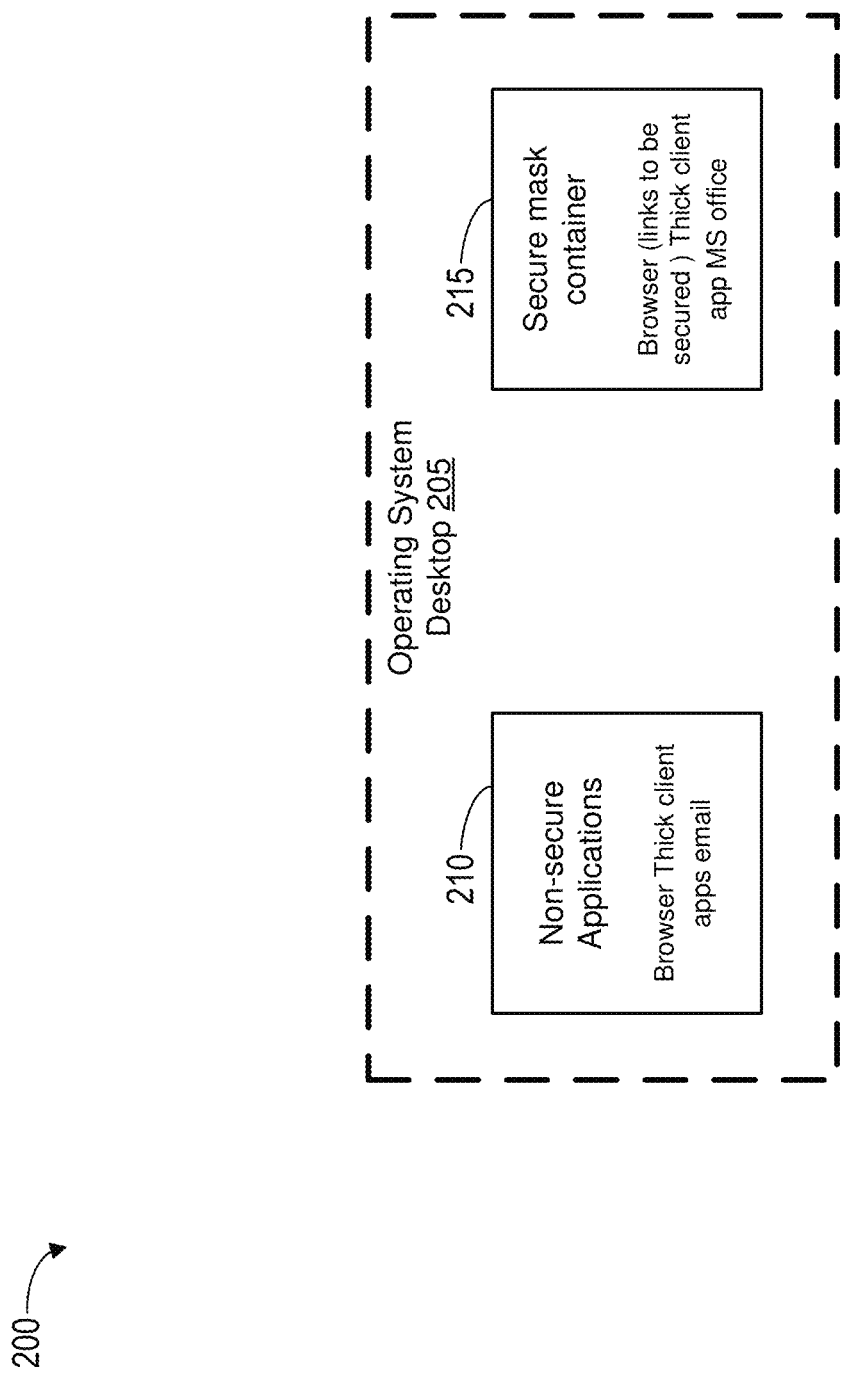
FIG. 2 is a schematic of application classes that may be masked by the real time data protection and intelligent interaction system.

Referring to FIG. 2, FIG. 2 is a schematic 200 of application classes that may be masked by the real time data protection and intelligent interaction system 100. The real time data protection and intelligent interaction system 100 may perform masking operations on applications that run within an operating system desktop 205. In various embodiments, applications may operate within a secure mask container 215. Alternatively, applications may operate as other non-secure applications 210.

Applications that may operate within a secure mask container 215 may be thick client applications that are stored in the memory of the computer system 160 and operate through the operating system 105. On the other hand, non-secure applications 210 may be stored in the memory of an outside computer system such as a server that connects to the computer system 160. A computer system 160 may be more limited in the functions available to control data from non-secure applications 210 because data may come from an outside source. In non-secure applications, the user 165 may be inadvertently exposed to restricted data even if the computer system 160 does not store the restricted data.

The real time data protection and intelligent interaction system 100 may still protect data that is displayed via non-secure applications 210 because the output of the non-secure application 210 is identified by the screen elements identifier 130 and evaluated by the semantic parser 150 during every frame. The source of the data does not matter because only the output of the non-secure application is evaluated. Thus, the real time data protection and intelligent interaction system 100 is a solution for protecting data from exposure to users 165 even where the data comes from a server that connects to the computer system 160.

Figure 3:
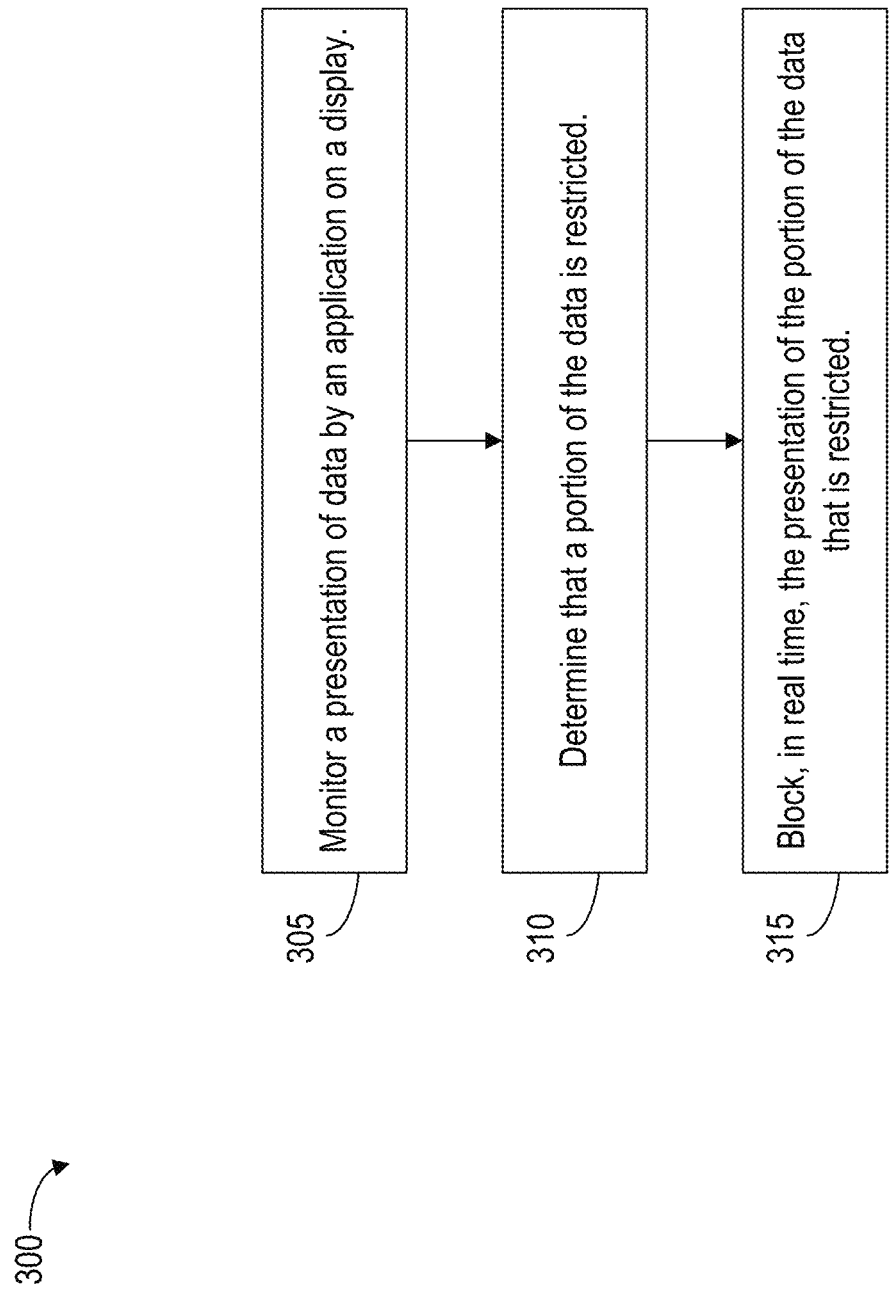
FIG. 3 is a flow diagram of a process for the real time masking of data in an application.

Referring to FIG. 3, FIG. 3 is a flow diagram of a process 300 for the real time masking of data in an application. The process 300 may be used to protect the inadvertent disclosure of data to users 165 that do not have access to the data. Protected data may include trade secrets or personally identifiable information. At step 305, the process 300 may monitor a presentation of data by an application on a display.

A screen parser module 110 may parse text or other data so that the data can be evaluated by a semantic parser 150.

At step 310, the process 300 may determine that a portion of the data is restricted. The semantic parser 150 may evaluate the data based on one or more rules from the rules database 145. The rules may be applied to determine whether data that is displayed in each frame of an application should be masked. A set of rules that is used may be based on a level of clearance of the user 165. For example, a user 165 with no clearance may have a broad set of rules while a user 165 with a high level clearance may have no rules.

At step 315, the process 300 may block, in real time, the presentation of the portion of the data that is restricted. In various embodiments, the process may operate once for every frame of an application. Restricted data is not likely to be accidentally presented on a display because every frame is evaluated by the semantic parser 150. The masking engine 135 may implement one or more functions to hide the restricted data while allowing the application to otherwise function normally. In various embodiments, a masked output control 155 may prevent a user 165 from providing input in a restricted area of a display. For example, the user 165 may be prevented from moving a mouse pointer over an area that is restricted.

Figure 4:
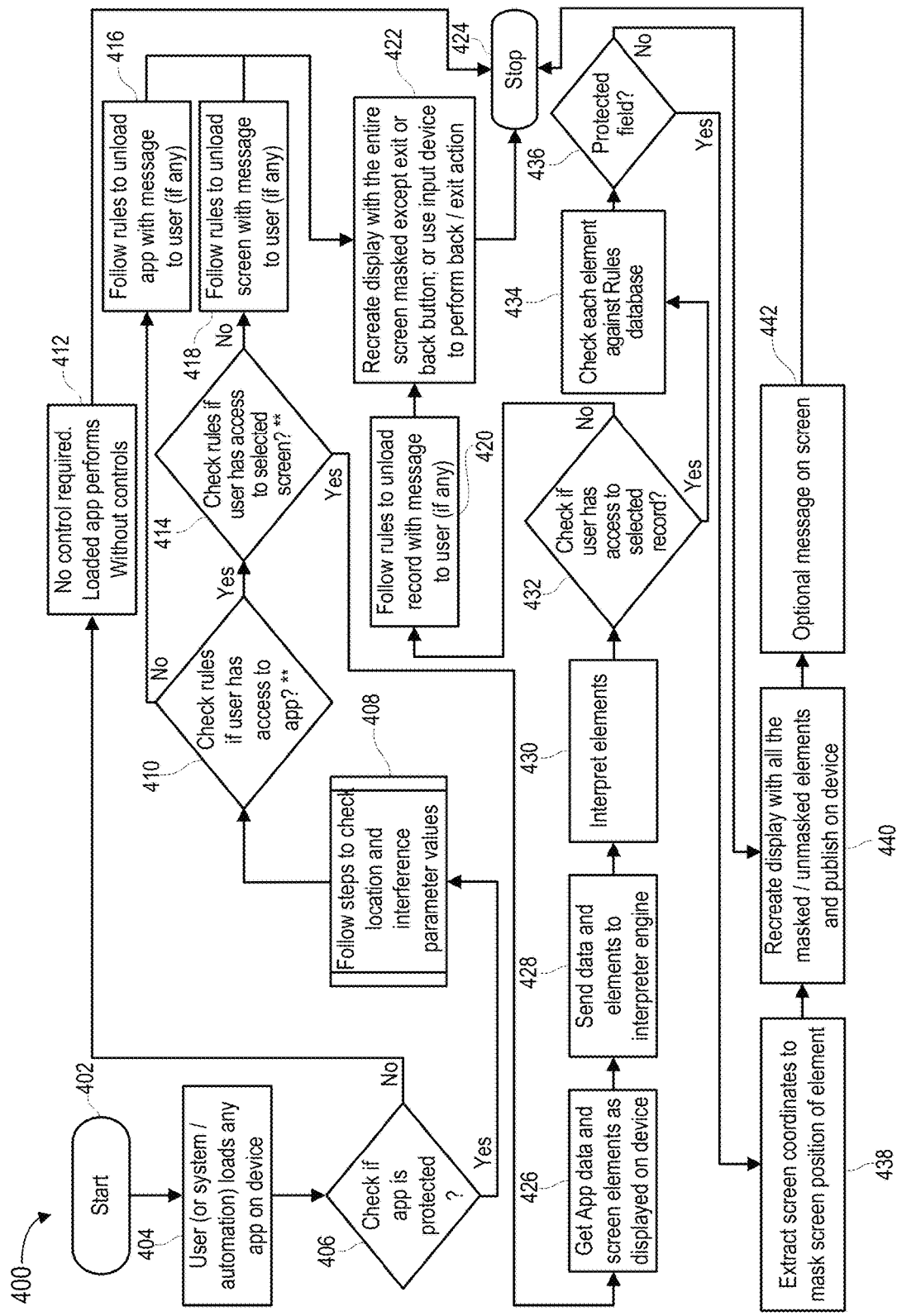
FIG. 4 is a flow diagram of a process for masking and restricting read access in an application.

Referring to FIG. 4, FIG. 4 is a flow diagram of a process 400 for masking and restricting read access in an application. The process 400 may be used to hide restricted data from view of a user 165 that does not have proper access to the restricted data. At step 402, the process may be started on a device. The process 400 may run in the background of an operating system 105 on a device. In various embodiments, the device may be configured to always run the process 400. At step 404, a user 165 may load any application on the device. In various embodiments, the device may be restricted in the applications that may be loaded. However, because the process 400 may mask restricted data, the device may be configured to allow users 165, without clearance to view restricted data, to use the application.

At step 406, the process 400 may check if the application is protected. In various embodiments, the process 400 may be configured to only mask data on selected applications. In an exemplary embodiment, the process 400 may operate on all data. If the answer is NO at step 412, the process 400 may allow that application to be loaded without any controls. If the answer is YES at step 408, the process 400 may follow step 410 to check location and interference parameter values. An interference parameter may be any object or process that interferes with a biometrics scanner that identifies a user 165. If the biometric scanner is not able to function properly, the process 400 may be triggered to restrict all sensitive information. Similarly, if the biometric scanner identifies one or more additional users 165, the process 400 may be triggered to restrict all sensitive data. The location parameter may be the location of the computer system 160. The process 400 may be configured to protect all sensitive data when the computer system 160 is off site. The location parameter may be determined by an IP address, MAC address, GPS sensor or other method of determining a location of a device. At step 410, the process 400 may check rules to determine if the user 165 has access to the application. Various sets of rules from the rules database 145 may be used based on the access level of the user 165. If the user 165 does not have access to the application at step 416, the process 400 may follow rules for a user 165 without access. In various embodiments, the process may unload the application and notify the user 165 of the user's 165 lack of access. If the user 165 does have access at step 410, the process 400 may check rules at step 414 to determine if the user 165 has access to the selected screen. If the user 165 does not have access to the selected screen, the process may follow rules at step 418 to unload the screen and display the user 165 a message the notifies the user 165 of the lack of access to the screen. In various embodiments, the process 400 may then recreate a display at step 422 with the entire screen masked except for an exit or back button. The user 165 may be allowed to perform a back operation with an input device.

If the user 165 does have access to the screen, the process may, at step 426, retrieve application and screen elements as displayed on the device. The screen parser module 110 may be user to capture the screen elements for every frame as they are displayed. At step 428, the process 400 may send data and elements to an interpreter engine and interpret the elements at step 430. The interpreter engine may classify fields as per the intent and semantics based on a context and a domain. For example, the screen may contain the field "Cust. Identifier." This can be interpreted in its full form as "customer identifier." An example of a business domain is banking. An address in a banking domain may be interpreted as an address of a mortgage property.

At step 432, the process 400 may check if the user 165 has access to a selected record. Access to a selected record may be based on field values on screen, the identity of a user 165, location parameters, and interference parameters. If the user does not have access to the selected record, the process 400 may follow rules at step 420 to unload the record and display a message to the user 165 that the record was unloaded. The process 400 may proceed to step 422 and black out the screen except for a back or exit button.

Where the user 165 does have access to the selected record at step 434, the process 400 may check each element against the rules database 145. The semantic parser 150 may determine a set of rules based on the identity of the user 165 and check each element of each frame based on the set of rules. At step 436, the semantic parser 150 may determine whether each element is a protected field. At step 438, elements that are determined to be protected may have their screen coordinates extracted to mask the screen position of the element. The mask may eliminate the element to make the screen appear as though the element were not there. Alternatively, the process 400 may block the element with a colored box. At step 440, elements that are determined not to be protected are re-created on the display. Masked elements may be hidden while unmasked elements may be displayed for the user 165 to view. At step 442, the process may display a message on the screen to display a status of the data masking to the user 165. In various embodiments, the process 400 may inform the user 165 of the classification of the data that is restricted. For example, the message may say that the masked data contained personally identifiable information. At step 424, the process may stop. In various embodiments, the process 400 may repeat starting at step 408 and continuously iterate for every frame that is drawn from an application.

Figure 5:
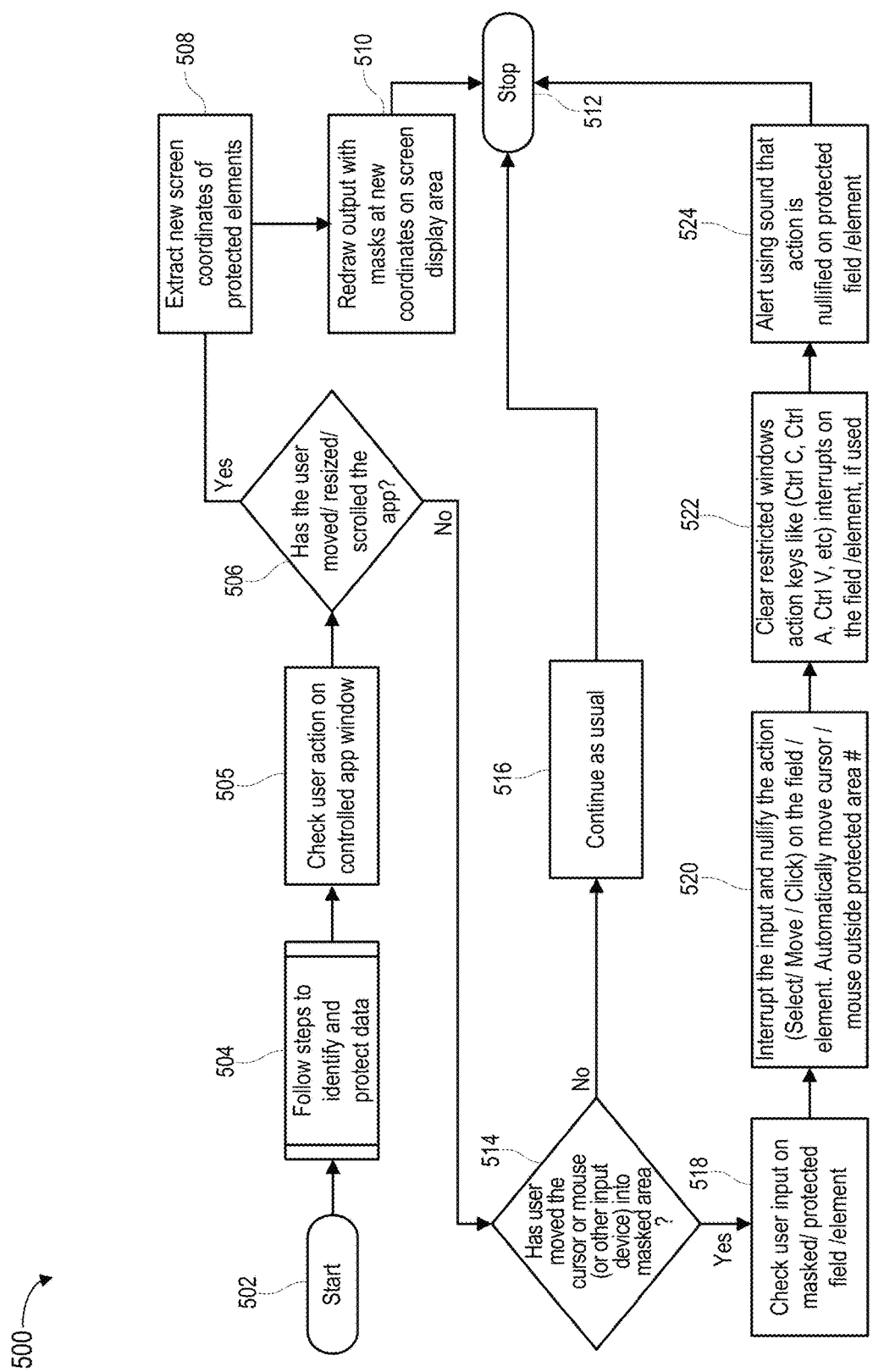
FIG. 5 is a flow diagram of a process for masking and restricting input and cursor access in an application.

Referring to FIG. 5, FIG. 5 is a flow diagram of a process 500 for masking and restricting input and cursor access in an application. In various embodiments, the real time data protection and intelligent interaction system 100 may be used to prevent a user 165 from accessing masked areas of a screen with input devices. At step 502, the process 500 for restricting input may be started for every frame that data is displayed on a device. Once the data is restricted, the application window may be considered controlled.

At step 504, the process may follow the steps of the process 400 from FIG. 4 to identify and protect data. Data that is restricted may be masked and blocked from view of the user 165. The process 400 disclosed in FIG. 4 may be repeated every frame and new data identified every frame. At step 505, the process 500 may check user 165 action on the controlled application window. A user 165 action may comprise input made by the user 165 in an application window. For example, keystrokes that the user 165 enters may be actions. Mouse click and mouse movement may be user 165 actions. At step 506, the process may determine if the user 165 has moved, resized, or scrolled the application. If so, the coordinates of the masking may be off. At step 508, if the user 165 has moved, resized, or scrolled the application, the process 500 may extract new screen coordinates of protected elements of the screen. For example, if the user 165 scrolled or moved the screen, the process 500 may translate the coordinates of the protected screen elements. If the user 165 resized the screen, the process 500 may perform a matrix operation to calculate new coordinates based on the resizing of the screen.

At step 510, the process 500 may redraw output with masks at new coordinates on the screen display area. In various embodiments, the process 500 may evaluate areas of the screen that were exposed based on the resizing of the screen.

At step 514, if the user did not move, resize, or scroll the screen, the process 500 may determine if the user 165 moved the cursor or mouse or other input device into a masked area. The user 165 may attempt to select data in a masked area even though the user 165 cannot view the masked area. At step 518, if the user 165 did move the cursor or mouse or other input device into the masked area, the process may check input on the masked element. An input may be the typing of a keystroke, the click of a mouse, or touch with a touch display. At step 520, the process 500 may interrupt the input and nullify the action. An example of the action may be a selection, a movement, or a click. The process 500 may automatically move the cursor or mouse outside the masked or protected area. At step 522, the process 500 may also clear restricted action keys. A restricted action key may be a copy command such as Ctrl C, a select command such as Ctrl A, and a paste command such as Ctrl V. The clearing of the action may interrupt functions that would have acted on the restricted field. At step 524, the process 500 may play an alert that the action is nullified on a protected field/element. For example, the alert may be a sound effect, or an error message on screen. In another example, the alert may be a message to the effect that the action is nullified.

At step 516, if the user 165 did not move the mouse, the cursor, or touch the masked area in another way, the process 500 may continue as usual. At step 512, the process 500 may be repeated for every frame that an application runs.

In various embodiments, the process 500 may monitor display level interactions to determine the functions of one or more buttons that are masked by the process 500. The process 500 may further determine whether the functions of masked buttons are required for the proper function of the application. For example, a save page button may be required for proper functioning of an application. An ADMIN may designate the save page button as "essential" and prevent the save page button from being masked from view or from input. In various embodiments, the process 500 may create a message for an admin user that lists functions of masked buttons or other input elements. In an exemplary embodiment, the process 500 may allow a user 165 to select buttons or other input elements while masking and preventing the copying of data in a masking area. The process 500 may thus prevent the act of masking from breaking the application.

Figure 6:
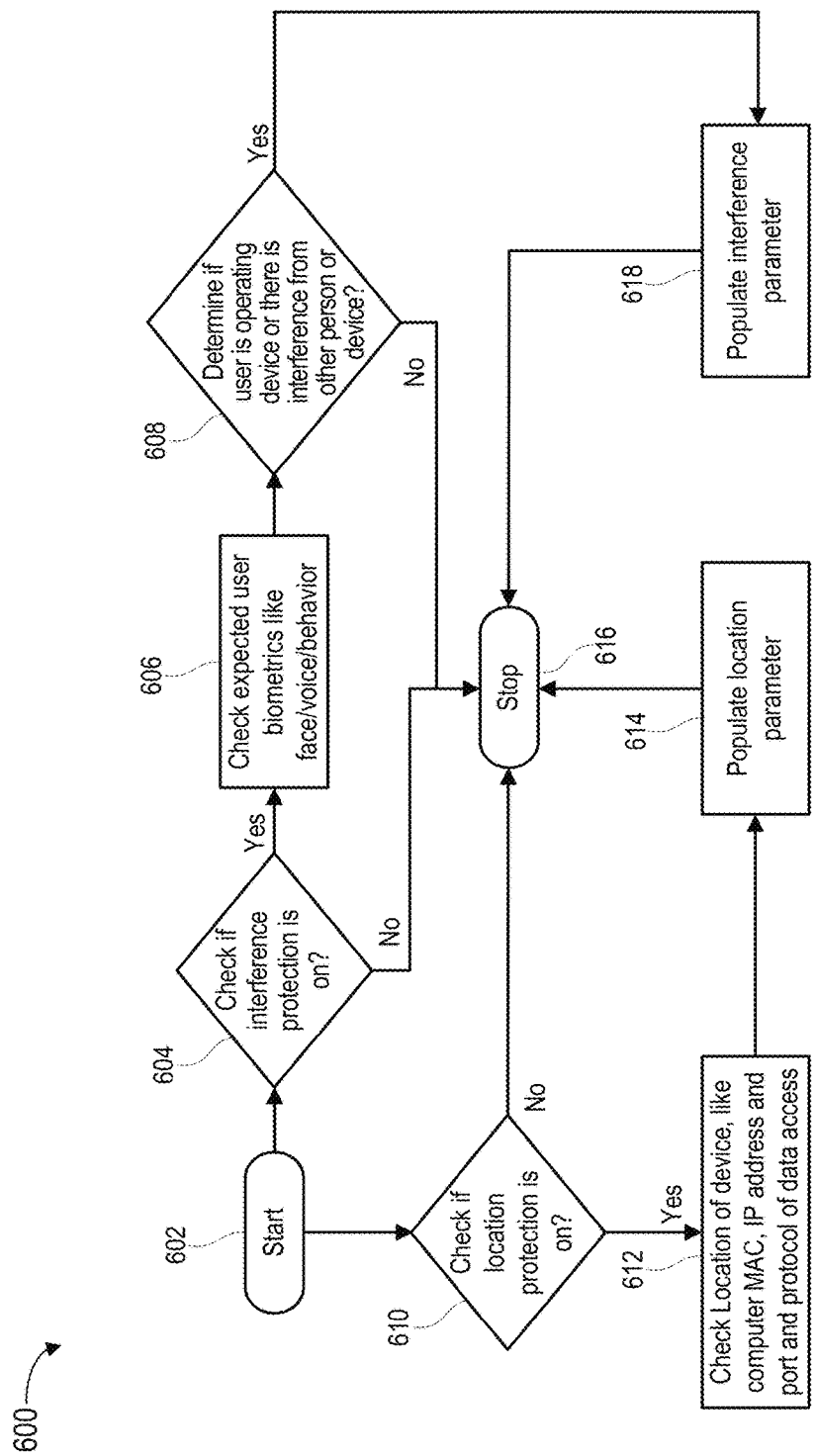
FIG. 6 is a flow diagram of a process for interference protection and location protection in an application.

Referring to FIG. 6, FIG. 6 is a flow diagram of a process 600 for interference protection and location protection in an application. Interference protection is the use of biometrics such as facial recognition, voice recognition, and typing patterns to identify a user 165. Interference protection also refers to any object or other restriction that prevents biometric analysis of the user 165. For example, an object that blocks a camera that is used to identify a user may trigger an interference protection. Location protection refers to the location of the device. In various embodiments, the process 600 may be configured to operate differently based on the location of the device. For example, an application that is used to look up hospital patient records may be configured to not operate while away from the hospital.

At step 602, the process 600 of interference and location protection may start. The process may start when an application is started. In various embodiments, the process starts continuously to determine if any parameters have changed while the application is running. At step 604, the process 600 may check to determine if interference protection is on. In various embodiments, the interference and location protection may be switched on and off. At step 616, if interference protection is not on, the process 600 may stop. At step 606, if interference protection is on, the process 600 may check expected user biometrics such as facial recognition, voice recognition, and behavior. Behavior may be a typing pattern, a regular time of user, or the like. At step 608, the process 600 may determine if the user 165 is operating the device. The process 600 may also determine if there is interference from another person or device. Another person may be a person that can view the device. If the user 165 is not operating the device or no other person is present that can view the device, the process 600 may stop at step 616.

At step 618, if the process 600 determines that the user 165 is operating the device or that another person is in view of the device, the process 600 may populate the interference parameter. The interference parameter may be populated with the identity of the user and/or the presence of one or more other persons that may be able to view the device. After the interference parameter is populated, the process 600 may stop at step 616.

In various embodiments, the process 600 may determine that a monitoring device is in view of the device. A monitoring device may be a device that is capable of capturing or streaming an image of the display screen of the device. Examples of monitoring devices may be a camera, phone, tablet, or other tool that has the ability to take a photograph of the display screen. The process 600 may stop at step 616 once it detects the presence of a monitoring device. Alternatively, the process 600 may mask the display screen. In various embodiments, the process 600 may determine that the monitoring device is unauthorized. In one example, the process 600 may determine that an unauthorized monitoring device is a monitoring device that is possessed by an individual that is not able to view the data.

In an exemplary embodiment, a machine learning algorithm is used to determine the existence of a monitoring device. The machine learning algorithm may classify objects in an image to determine whether an image contains a monitoring device. In an exemplary embodiment, the process 600 may determine a different set of rules to restrict data on a screen when the process 600 detects the presence of a monitoring device. In various embodiments, the monitoring device may be assigned a type based on the identity of the user that possesses the monitoring device. In one example, a monitoring device may be classified as unattended if it is not possessed by a user. Alternatively, it may be classified as possessed if it is held or controlled by a user. The possessed monitoring device may be further classified based on the type of user that possesses the monitoring device. For example, a monitoring device that is possessed by a licensed user may be classified as "licensed-possessed".

At step 610, the process may check if location protection is on. Like interference protection, location protection may be switched on and off. When on, data on the device may be masked based in part on the location of the device. If location protection is off, the process 600 may stop at step 616. At step 612, if location protection is on, the process 600 may check for the location of the device. For example, the location may be a computer MAC address, an IP address, a port, or a protocol of data access. The location data may indicate a location of the device. At step 614, the process 600 may populate the location parameter. The location parameter may be evaluated by the process 400 from FIG. 4 to determine if the application may be used. In various embodiments, the location parameter may determine a set of rules from the rules database 145. For example, a broader set of rules may be used when the location parameter indicates that the device is away from a standard location. The process 600 may stop at step 616 after the location parameter is populated. In various embodiments, the location parameter may prevent the use of an application away from a work location. In another embodiment, the location parameter may allow an application to be used at a home office of an employee. The location parameter may include geo-political boundaries. A user may be restricted based on the country that the user is in. For example, users may be restricted from use of a function or an application unless the users are in a specific country. Off-shoring, or removing a service to a different country, may be enforced through the process.

Figure 7:
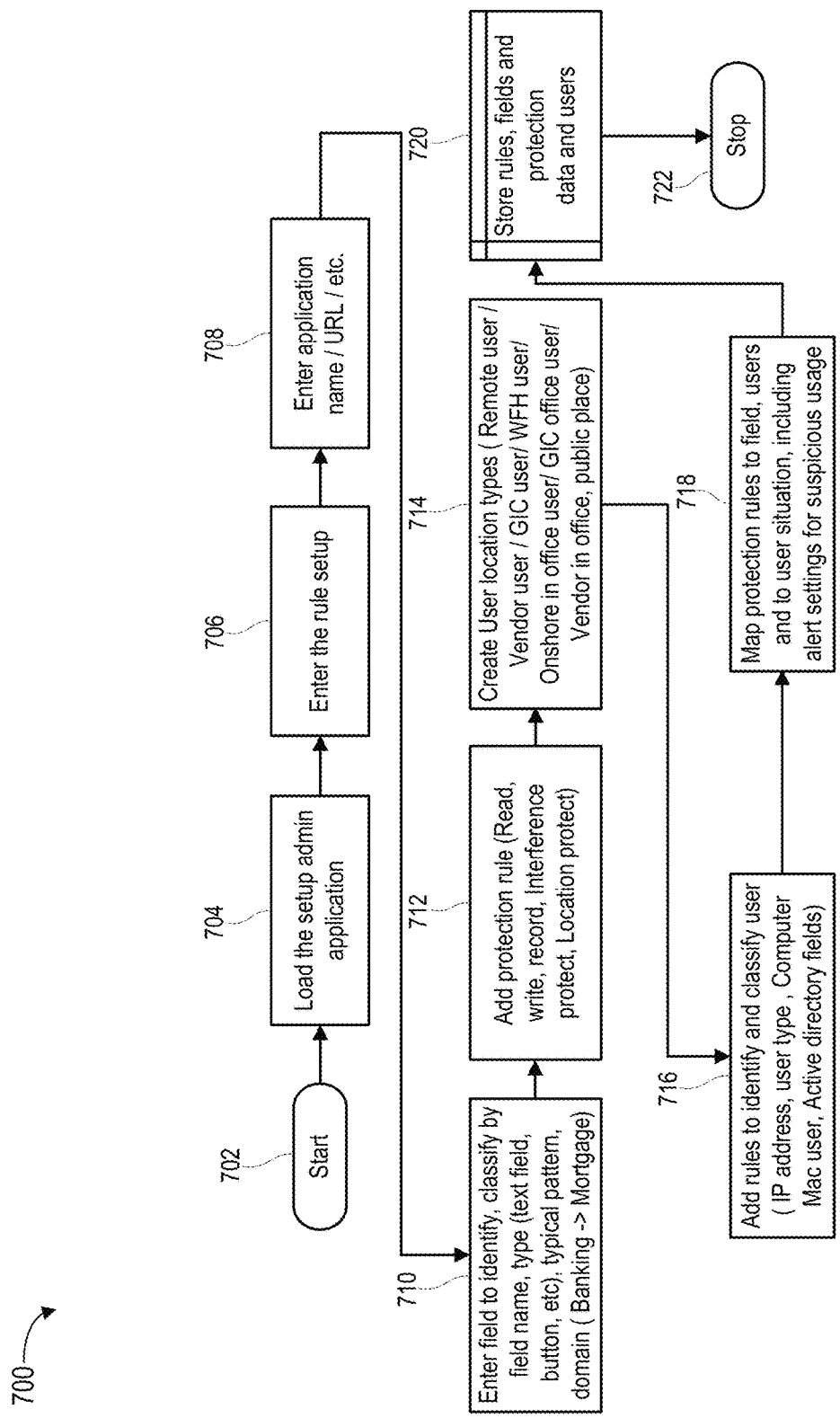
FIG. 7 is a flow diagram of a process for manually setting up a real time data masking system.

Referring to FIG. 7, FIG. 7 is a flow diagram of a process 700 for manually setting up a real time data protection and intelligent interaction system 100. In a manual mode, an application admin user may set up the configuration details including the fields and data elements to be protected. The process 700 may be continuous as the underlying application that is protected changes. If a new field is added, the admin user needs to enter setup again. In manual mode, the admin user needs to enter specific details.

At step 702, the admin user may start the process 700 of setting up the manual mode. The admin user may need to start the process 700 every time there is a change in the elements or fields of an application. At step 704, the admin user may load the setup admin application. The setup admin application may be a program that is designed to configure the real time data protection and intelligent interaction system 100. At step 706, the admin user may enter the rule setup. The rule setup may be a process that initiates the conditions that may be checked to determine if data should be protected. There may be many rules for each application to check against. An example of a rule may be a field for a social security number. The rule could be satisfied by data in an application that says, "social security number." The user admin may create rule that check for addresses or number combinations that are likely to be associated with protected data. At step 708, the admin user may enter the application name, URL, or the like. In various embodiments, the admin user may setup rules for multiple applications, URL's, etc. At step 710, the admin user may enter a field to identify or classify by field name, type (text field, button, etc.), typical pattern, or domain (such as Banking→Mortgage). A field name may be the name of a field given by the admin user. The type may be a text field, button, link, image, or the like. The typical pattern may be an arrangement of data. For instance, the data may be arranged in the typical column and row grid pattern. The domain may be an area of commerce. For instance, data may be in a business domain or banking domain.

At step 712, the admin user may add one or more protection rules. A protection rule may be a protection against reading restricted data. Another protection rule may be a protection against writing over restricted data. Another protection rule may be a protection against copying restricted data. Another protection rule may be a location protection. Yet another protection rule may be a protection against interference such as the presence of an unidentified individual or a monitoring device. Yet another protection rule may protect against use based on a time. A rule may restrict use during the night hours of the day. Yet another protection rule may be a protection against the use of social media sites. A rule may prevent the use of social media sites with the exception of sites which are required for work during work hours. Yet another protection rule may restrict the use of messaging applications. A messaging application may be restricted such that an operator with a location may be prevented from sending information that is visible in the application. As such, a messaging application may be restricted from communicating restricted information.

At step 714, the admin user may create user location types. Various types of users may have different sets of rules applied to them based on the location of the user. A user location type may be a remote user. Another user location type may be a vendor user or a vendor in office user. Another user type may be a work from home user. Another user location type may be a public place.

At step 716, the admin user may add rules to identify and classify a user. The rules identify the user by IP address, user type, computer, MAC address, and active directory fields. A user may be identified based on the rule to identify and classify the user. At step 718, the admin user may map protection rules to various fields. Protection rules may also be mapped to users and to user situations. A user situation may comprise the time of day that an application is being used. Alert settings may be set to trigger upon suspicious usage. For example, a sound effect, message to be played, or an error message on a screen may be set up when suspicious usage occurs.

At step 720, the admin user may store the rules, fields, and protection data for users. Once stored, the real time data protection and intelligent interaction system 100 may use the stored values to mask data in real time. At step 722, the process 700 may stop as the admin user closes the setup admin application.

Figure 8:
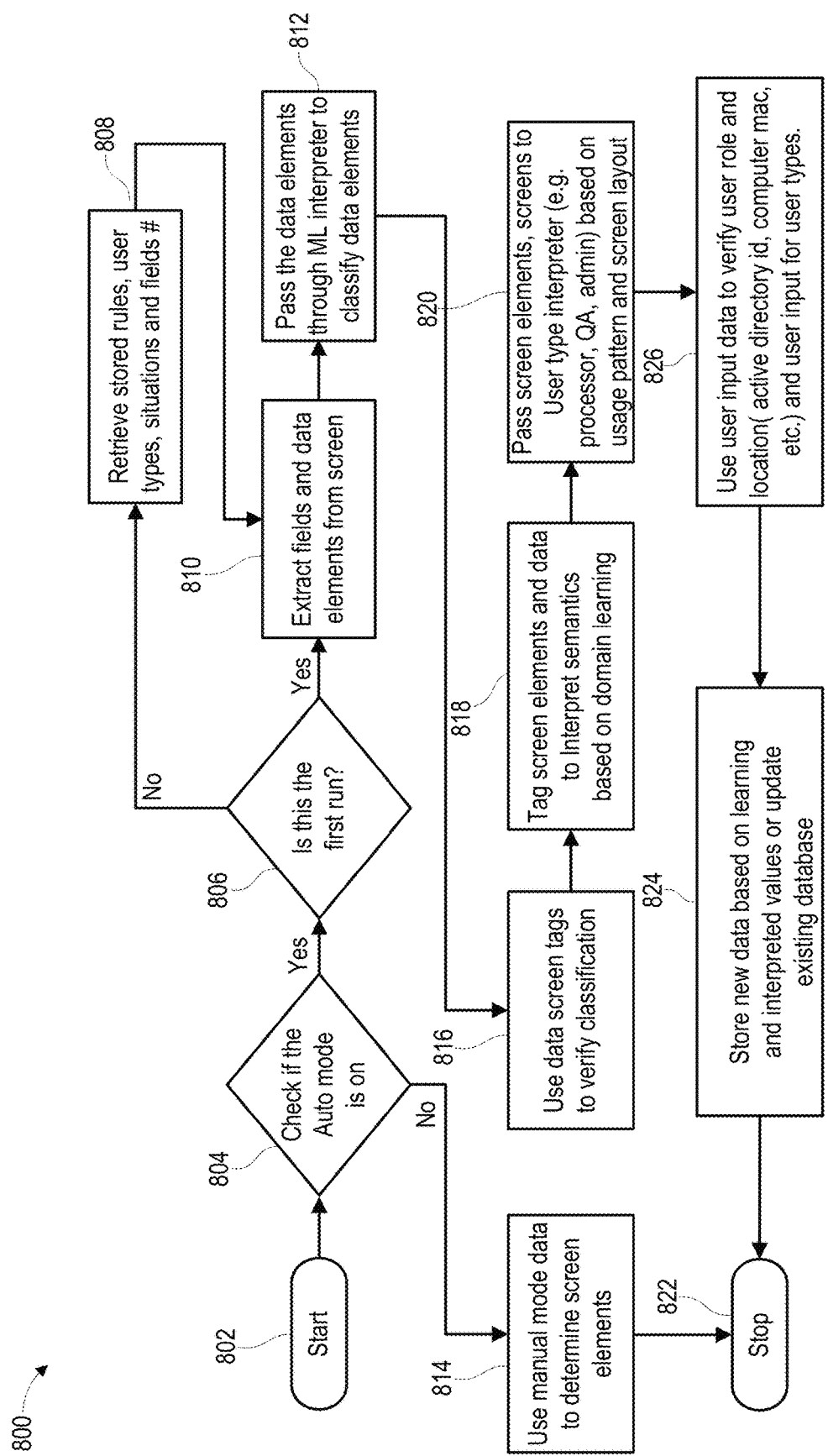
FIG. 8 is a flow diagram of a process for initial interpretation setup of the interpreter engine and machine learning flow for runtime screen interpretation and continuous learning.

Referring to FIG. 8, FIG. 8 is a flow diagram of a process 800 for initial interpretation setup of the interpreter engine and machine learning flow for runtime screen interpretation and continuous learning. A machine learning mode may classify the fields as per the intent and semantics based on the business context and/or business domain. At step 802, the process 800 may start. The process may be run once to set up the interpreter engine and started again when the rules are modified.

At step 804, the process 800 may check to determine if auto mode is on. In auto mode, rules and other parameters are automatically created to determine whether to protect data in an application. At step 814, if auto mode is not on, the process 800 may use manual mode data that was saved by an admin user to determine a protection for screen elements. The process 800 may then stop at step 822. In an exemplary embodiment, an entire application may be masked. For example, an entire application may be masked based on use of the application outside of a permissible area. A user may be restricted, in one implementation, to selecting a close or quit button to unload the application.

At step 806, if the auto mode is on, the process 800 may determine if it is the first time that the process 800 has been run. If the process 800 has been run before, some fields or data may be retrieved. At step 810, if the process 800 has not been run before, the process 800 may extract fields and data elements from the screen. The process 800 may populate fields based on the context that is displayed in an application. On the other hand, if the process 800 has not been run before, at step 808, the process may retrieve stored values. Stored values may include rules, user types, situations, and field numbers. Once the stored values are retrieved, the process 800 may move on to step 810 where the fields and data elements are extracted from the screen.

At step 812, the process 800 may pass the data elements through a machine learning interpreter to classify data elements. Various machine learning algorithms may be used to classify data elements. For example, a random forest machine learning algorithm may be used to classify data. A random forest machine learning algorithm classifies data based on a consensus of a set of decision tree algorithms. The various decision tree algorithms may be trained with training data for interpreting data fields. For instance, data that relates to health characteristics of an individual may be classified as being in a medical context. Ideally, the various decision tree algorithms may be trained such that they have a low correlation with one another. With a low correlation, the various decision tree algorithms may promote a well-rounded random forest algorithm.

At step 816, the process 800 may use data screen tags to verify classification. Applications may often contain data within labeled tags. The process 800 may check the tags to verify that the machine learning algorithm correctly classified data elements. At step 818, the process may tag screen elements and data to interpret semantics based on domain learning. Domain learning comprises interpreting data based on the context of the domain of the data. For example, a data element in a real estate domain may be interpreted differently from a data element in a health care domain.

At step 820, the process 800 may pass screen elements and screens to the user type interpreter based on the usage pattern and screen layout. Examples of a user type may be a processor user, a quality assurance user, and an admin user. The user type interpreter may ascertain the user type. At step 826, the user type interpreter may use user input to verify the user role and location. The interpreter may also determine an intent for the elements. Examples of a location may be an active directory id, computer MAC address, and an IP address. The user type interpreter may also use user input to determine a user type. For example, a quality assurance user may typically enter types of data that are distinguishing from an admin user.

At step 824, the process 800 may store the new data based on the machine learning and interpreted values. Alternatively, the process 800 may update an existing database if data is already stored. At step 822, the process 800 may stop.

Figure 9:
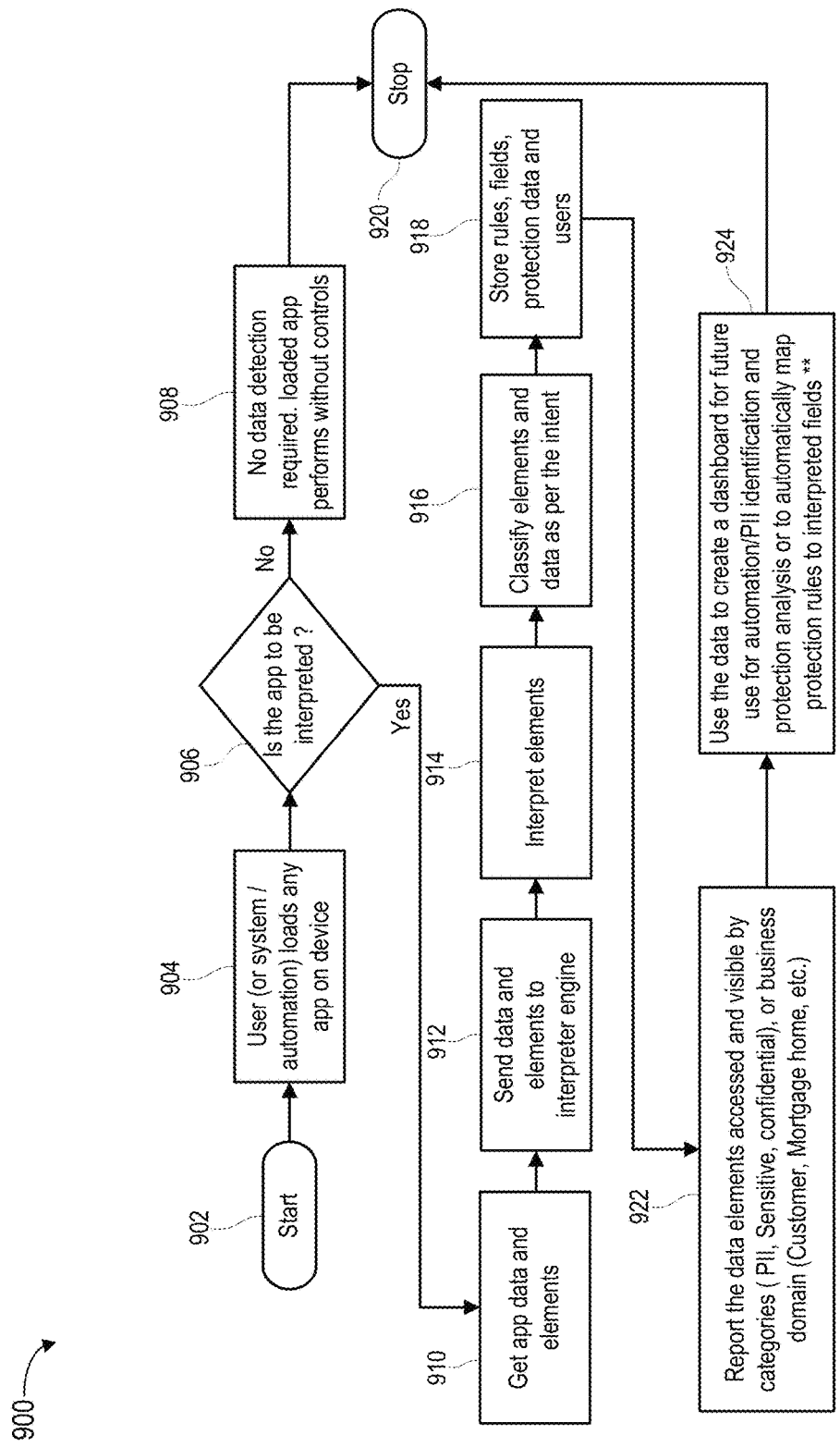
FIG. 9 is a flow diagram of a process for setting up a real time data protection and intelligent interaction system in an automatic mode.

Referring to FIG. 9, FIG. 9 is a flow diagram of a process 900 for setting up a real time data masking system in an automatic mode. In an automatic mode, the application uses a learning and discovery mode where, through an AI, the application interprets the screen data and identifies subsequent protection based on interpreted intent. In various embodiments, the application may run in a mixed mode, wherein the initial setup in manual and subsequent learning can be turned on for changes. An automatic mode can also be used to learn and create a dashboard for subsequent used. A subsequent use may be an automation identification and automatic data classification. For example, the automatic mode may be used to look at an application and understand the screens in the application. The automatic mode may be further used to understand data fields and elements. The automatic mode may report personally identifiable information to the application along with screens that contain those fields. This may aid in the understanding of the security risk of various applications. As opposed to manual mode, in automatic mode, protection can be generalized. For example, an admin user may enter "Read protection for person identifiable information for application X" where protection is turned on for personally identifiable information.

At step 902 of the process 900, the process 900 may start. In various embodiments, the process 900 may be activated by an admin user. In an exemplary embodiment, the process 900 may be configured to automatically activate in applications. At step 904, an application is loaded into the memory of a device. Once in the memory, the application may run on the device. The application may be loaded by a user, by the system, or by an automation.

At step 906, the process may determine if the application is to be interpreted. At step 908, if the application is not to be interpreted, then no data detection is required. The application may be loaded and perform without controls. At step 920, the process 900 may stop. At step 910, if the application is to be interpreted, the process may retrieve application data and elements. The screen parser module 110 may retrieve the data and application elements. At step 912, the process 900 may send the data and elements to an interpreter engine.

At step 914, the process 900 may interpret the elements. The elements may be interpreted through use of a machine learned algorithm. At step 916, the interpreted elements may be classified based on their interpretations. An intent may be based on a classification and content of the elements. Rules may be determined based on the intent. For example, the process may create rules that allow an admin user to protect all financial data. For example, data that relates to income may be classified as financial data. At step 918, the process 900 may store rules, fields, protection data, and users. The process 900 may store the rules such that the rules may be applied for various users of the application. The rules may also be partially set up by an admin user. For example, the admin user may determine that, based on the report from step 922, the application should only actively mask personally identifiable information. The rules may be easily adjusted to provide masking for only personally identifiable information while allowing other types of rules. In various embodiments, the stored values may be setup initially in a manual mode.

At step 922, the process 900 may report the data elements that were accessed by the process 900 and are visible by categories. The report may provide insight into the amount of confidential data that may be potentially disclosed by an application. At step 924, the process 900 may use the data to create a dashboard for future use. For example, the future use may be to automate the identification of personally identifiable information. A future use may be a protection analysis or to automatically map protection rules to interpreted fields. At step 920, the process may stop.

Figure 10:
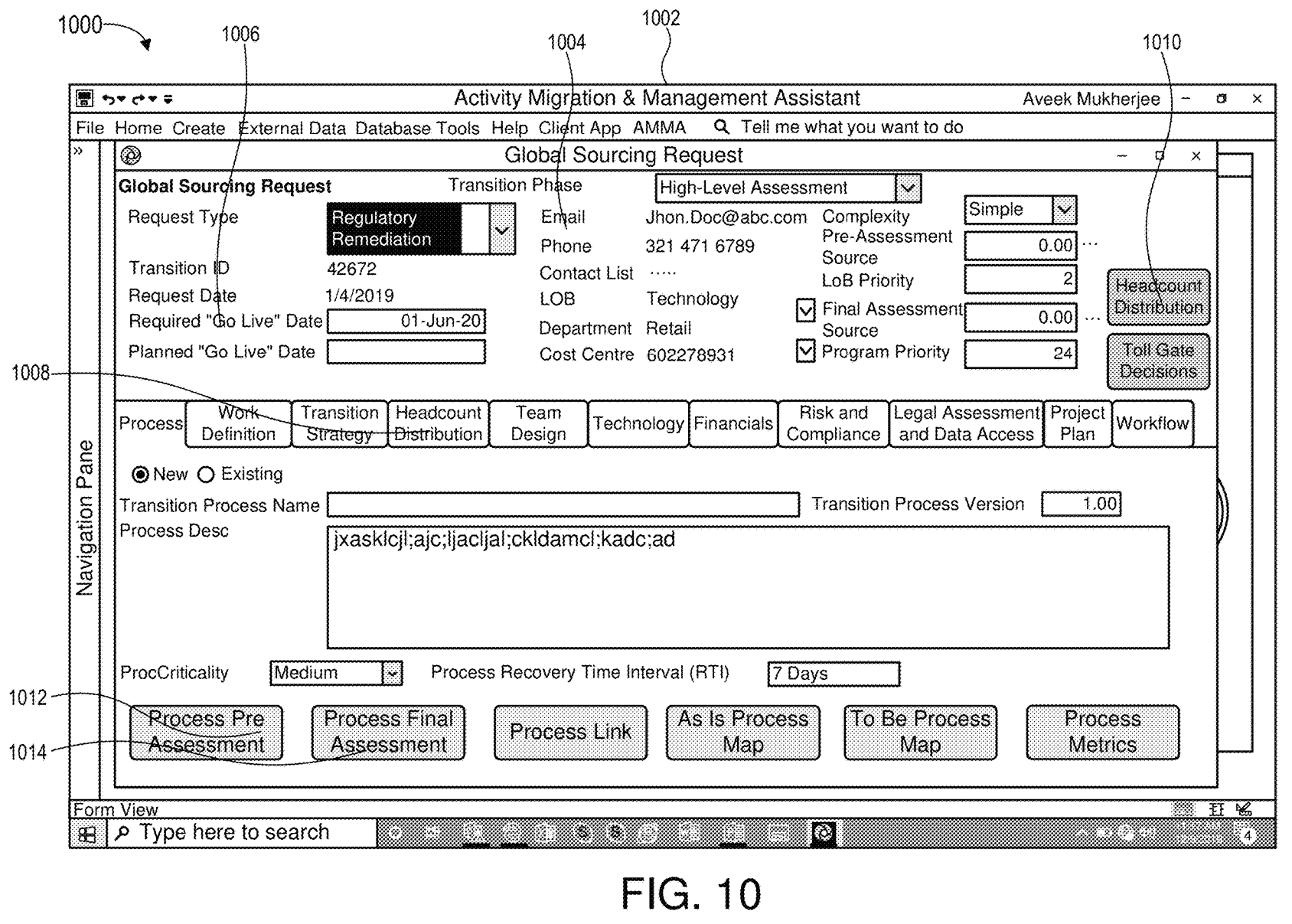

Referring to FIG. 10, FIG. 10 is an illustration of a screen 1000 of an application that may be protected by a real time data protection and intelligent interaction system 100. The illustration shows an activity migration & management assessment screen 1002 that is displayed by an application. The application may contain various data that is restricted to certain users.

The real time data protection and intelligent interaction system 100 may determine a set of rules based on a user 165 of the application. If the user 165 is not authorized to view some data, the real time data protection and intelligent interaction system 100 may evaluate the data in each frame of the application to determine what data, if any, should be masked.

The activity migration & management assessment screen 1002 has various data elements that may be masked based on rules and protection data that are stored. As shown in FIG. 10, the real time data protection and intelligent interaction system 100 may determine that the personally identifiable information 1004 and Go Live date 1006 are restricted. The real time data protection and intelligent interaction system 100 may further determine that the Headcount Distribution button 1010 and the Headcount Distribution tab 1008 are restricted. And the real time data protection and intelligent interaction system 100 may further determine that the Process Pre-Assessment button 1012 and Process Final Assessment button 1014 are restricted.

Figure 11:
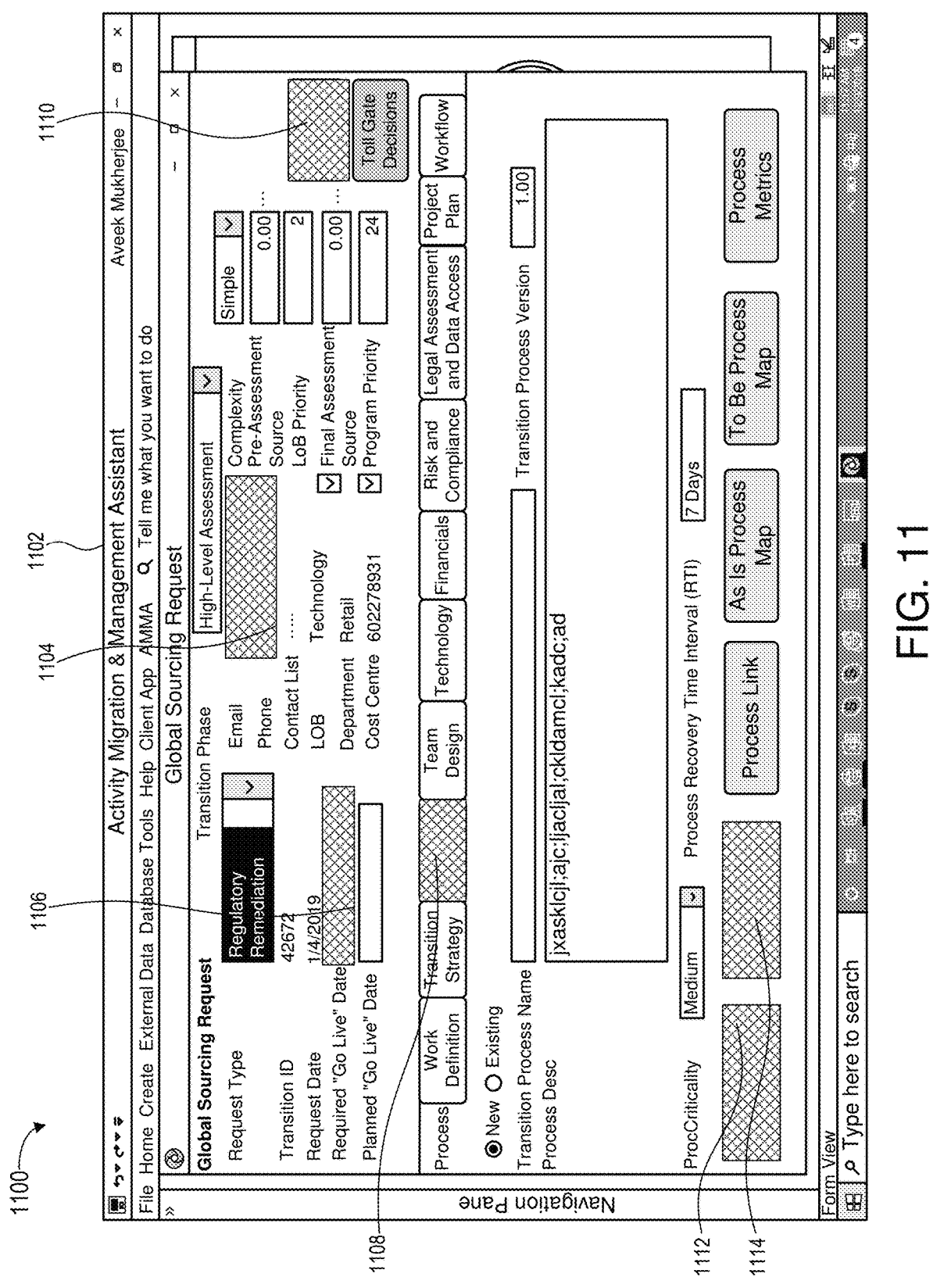

Referring to FIG. 11, FIG. 11 is an illustration 1100 of a screen of an application where restricted fields have been masked with blocks. The real time data masking system 100 may take action to hide data elements that are restricted. As shown in FIG. 11, one method of hiding data elements is to place a box over the data elements.

On the activity migration & management assessment screen 1102, the personally identifiable information 1004 is blocked by a box 1104. Likewise, the Go Live date 1006 is blocked by a box 1106. The Headcount Distribution tab 1008 is blocked by a box 1108 along with the Headcount Distribution button 1010 which is also block by a box 1110. The Process Pre-Assessment button 1012 is blocked by a box 1112. And the Process Final Assessment button 1014 is blocked by a box 1114.

In various embodiments, the real time data protection and intelligent interaction system 100 may prevent a user from performing input operations over masked areas. For example, the user may be prevented from moving a mouse pointer over one of the boxes. In another example, the user may be prevented from typing within a box or performing copy and paste functions on the contents of a box.

Figure 12:
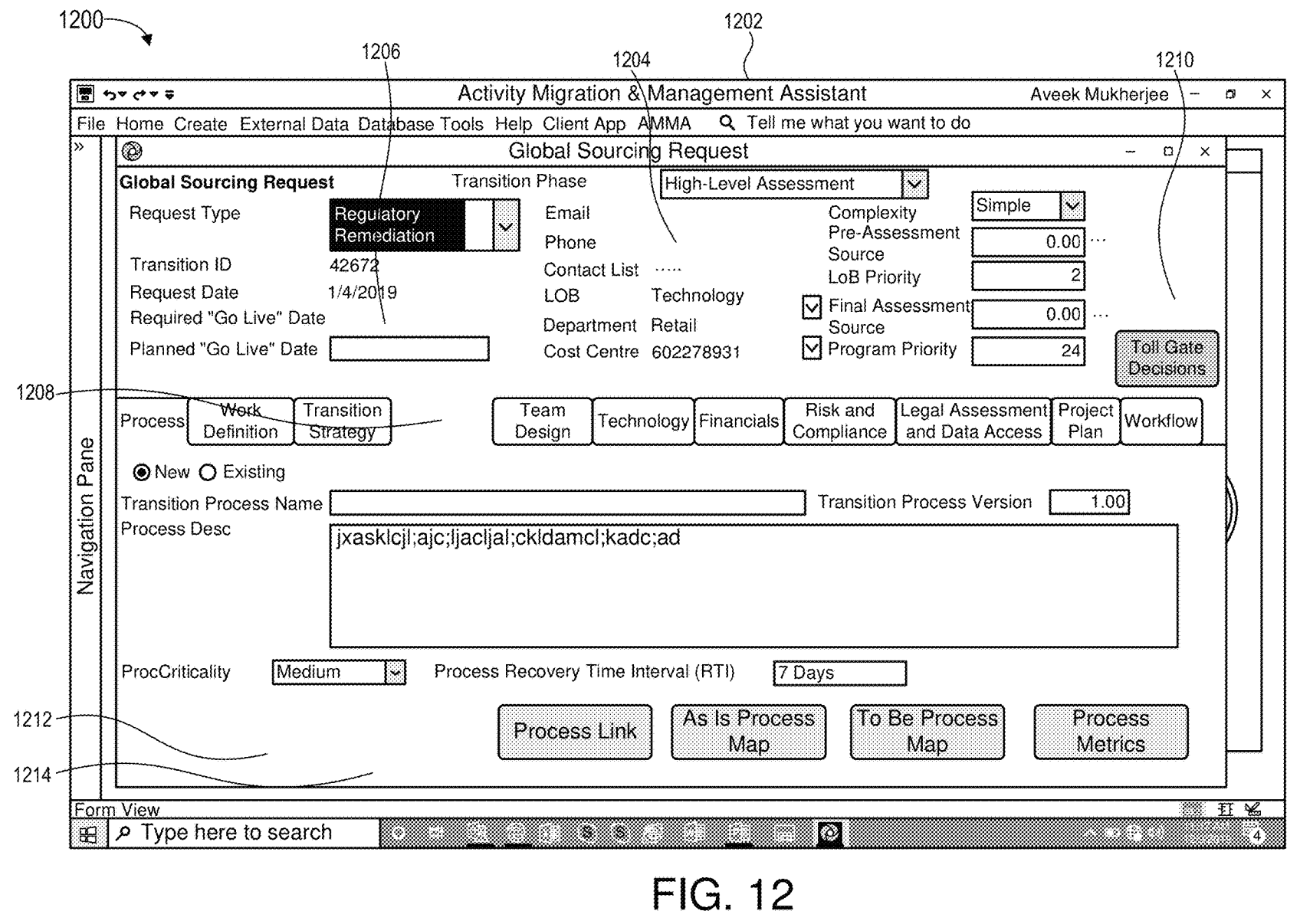

Referring to FIG. 12, FIG. 12 is an illustration 1200 of a screen of an application where restricted fields have been masked by deletion. In various embodiments, the real time data protection and intelligent interaction system 100 may prevent the display from reproducing the restricted data in any way. The user may be prevented from even knowing that the restricted data existed at all. Further, the input operations on the masked area may produce no effect as though nothing existed there.

The activity migration & management assessment screen 1200 has white space 1202 where the personally identifiable information 1004 existed. Similarly, there is a white space 1204 at the location of the personally identifiable information. White space 1206 exists where the Go Live date 1006 existed. White space 1208 is where the Headcount Distribution tab 1008 existed and white space 1210 is where the Headcount Distribution button 1010 existed. White space 1212 is where the Process Pre-Assessment button 1012 existed and white space 1214 is where the Process Final Assessment button 1014 existed.

Figure 13:
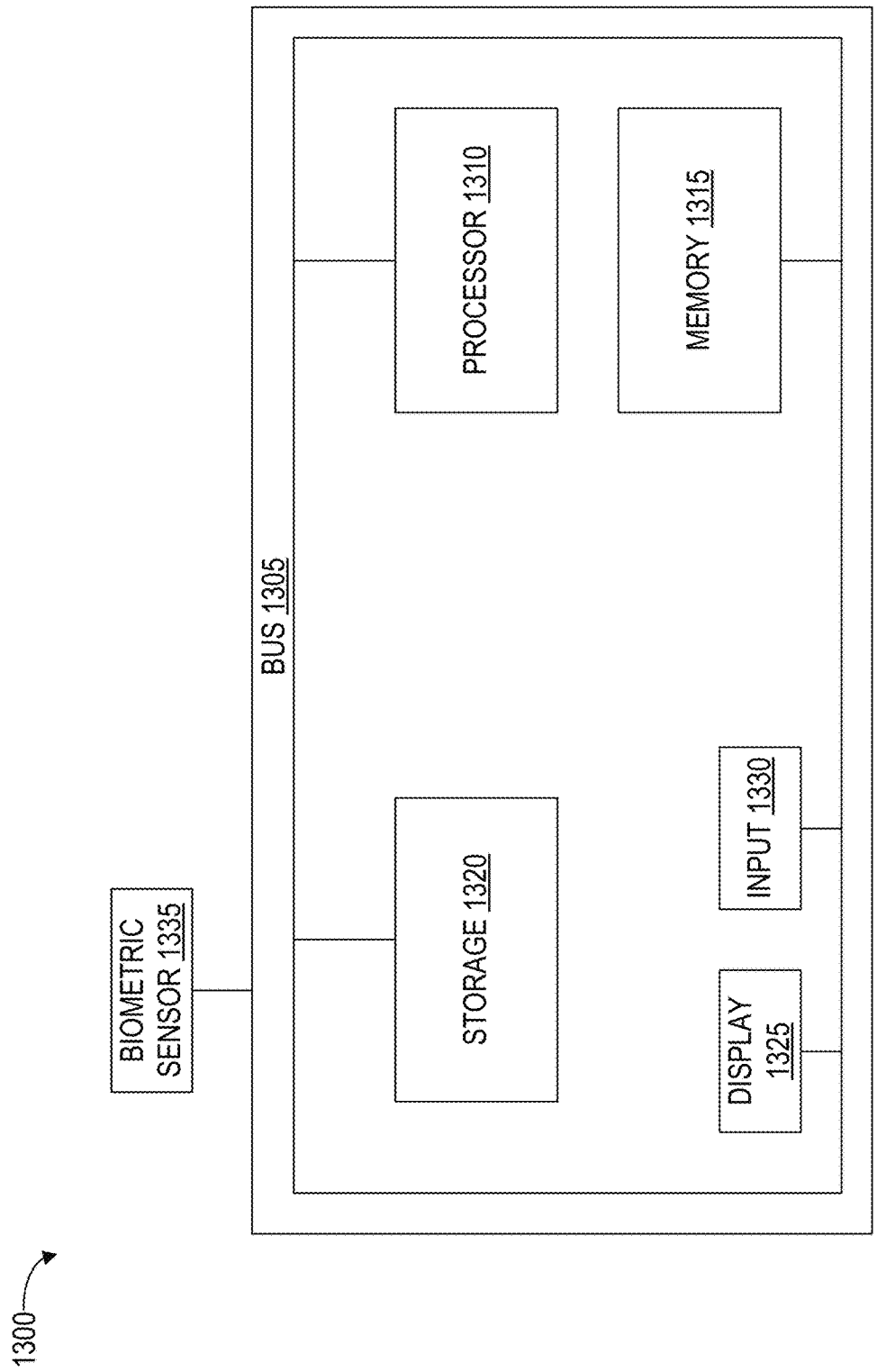
FIG. 13 is a schematic illustrating the computing system that may be used to implement various features of embodiments described in the present disclosure.

Referring to FIG. 13, FIG. 13 is a schematic illustrating the computing system 1300 that may be used to implement various features of embodiments described in the present disclosure. The computing system 1300 may be configured to evaluate elements of data on a frame by frame basis. Various parts of the computing system 1300 may be connected through a bus 1305, which facilitates the transfer of data or other signals from one component to the next within the computing system 1300.

In addition to the bus 1305, the computing system 1300 may include a processor 1310 that executes instructions and passes them back into the computing system 1300. The processor 1310 may comprise various electronic circuits such as a central processing unit ("CPU"), a graphics processing unit ("GPU"), a field programmable gate array ("FPGA"), a complex programmable logic device ("CPLD"), and an application specific integrated circuit ("ASIC"). The processor 1310 may be fast enough to process all data elements on a screen for every frame, which may require the processing of tens of frames per second.

The memory 1315 may be connected to the bus 1305 and transmit data and instructions to the various components of the computing system 1300. All data that is processed by the processor 1310 may be passed to the processor 1310 through the memory 1315. Instructions that were processed by the processor 1310 may be disseminated to the various components of the computing system 1300 by the memory 1315. Various types of memory may include random access memory ("RAM") and read only memory ("ROM").

To store large amounts of data, the computing system 1300 may include a storage 1320, which may be configured to store data while the computing system 1300 is powered off. Applications may be stored in the storage 1320 before being loaded into the memory 1315 when they are run by the computing system 1300. Settings for the real time data protection and intelligent interaction system 100 may be stored in the storage 1320. Rules in the rules database 145 may similarly be stored in the storage 1320. Examples of storage 1320 may include solid state drives and spinning magnetic hard drives.

The computing system 1300 may include a display 1325 that displays applications to a user 165. For every frame that is drawn on the display 1325, the processor 1310 may process data elements to determine if they are restricted. Data that is restricted may be masked on the display 1325 for each frame that is drawn.

The computing system 1300 may include one or more inputs 1330. For example, the computing system 1300 may include a mouse and a keyboard. The real time data protection and intelligent interaction system 100 may nullify input made by a user 165 that activates on a location that is being masked. Input commands outside of a masking location may be processed as usual.

One or more biometric sensors 1335 may determine the identity of a user 165. The real time data protection and intelligent interaction system 100 may be configured to enter a maximum protection mode if the biometric sensor 1335 has interference. For example, an object that blocks the biometric sensor 1335 from operating may cause the real time data protection and intelligent interaction system 100 to mask all protected data or shut down an application. Types of biometric sensors 1335 may include cameras to recognize faces, print scanners to recognize fingerprints, and microphones that can identify users 165 through voice recognition. A sensor may be configured to identify monitoring devices such as cameras or tablets.

Figure 14:
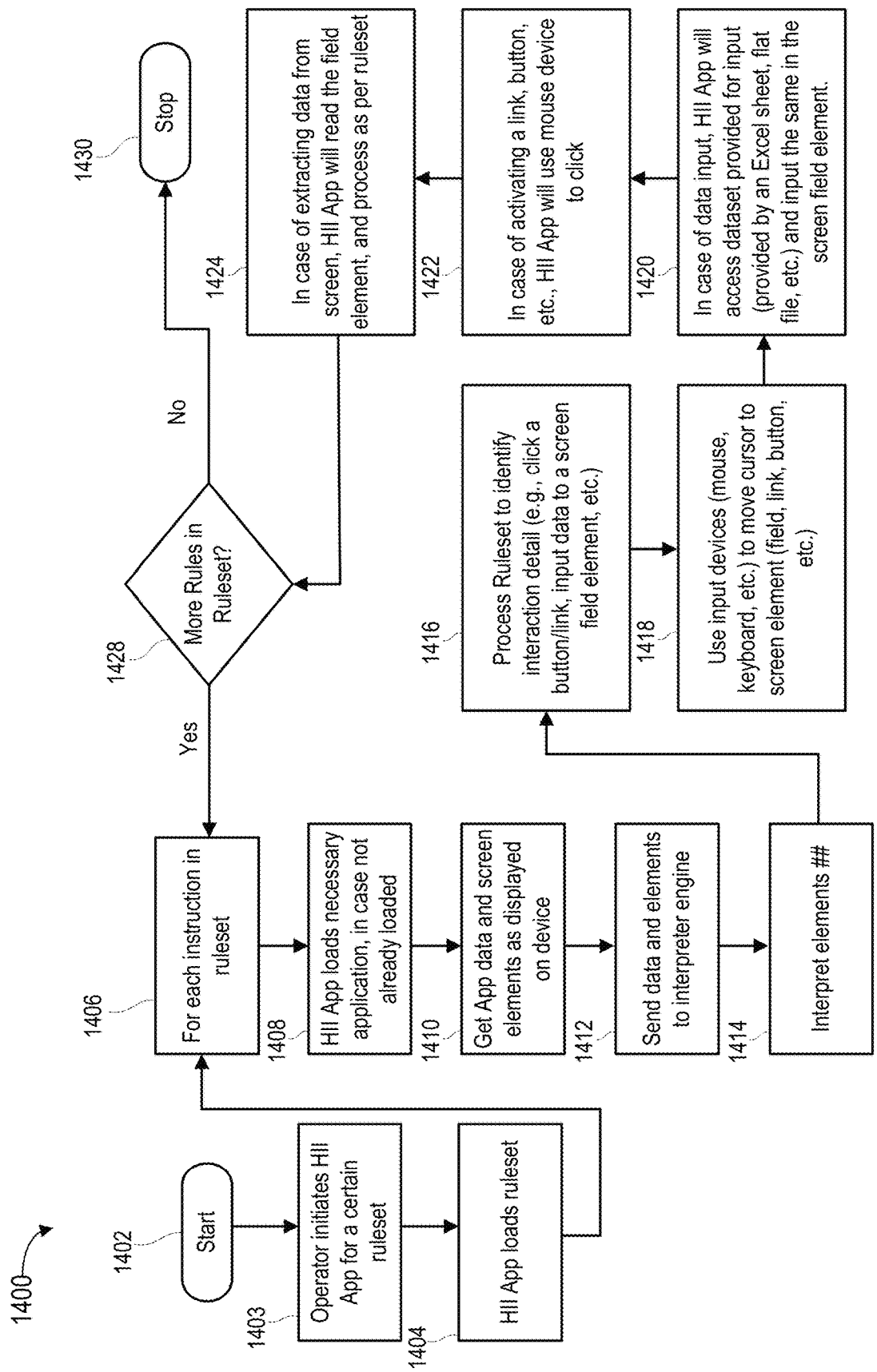
FIG. 14 is a flow diagram of a process of implementing a human inspired interaction feature.

Referring to FIG. 14, FIG. 14 is a flow diagram of a process 1400 of implementing a human inspired interaction feature. The human inspired interaction feature may use a ruleset to navigate screen elements and interact with the elements or data therein. For example, the process 1400 may automatically load an application, navigate the screen elements of the application, and populate fields of the screens with an associated dataset. Similarly, the process may automatically extract data from a system using a predefined ruleset.

In an exemplary embodiment, the human inspired interaction feature may be used to manipulate data without risk of the data being handled by a human operator. For instance, the process 1400 may automatically remove data from an application before one or more human operators use the application. Further, the process 1400 may be used to remove data from the view of one or more monitoring devices. In various embodiments, the human inspired interaction feature may be utilized without data masking or restricting data. The human inspired interaction may operate independently without various restriction features being activated. For instance, the human inspired interaction may operate without discriminating between restricted or unrestricted data. The HII interaction can assist the human operator in completing the data input task by navigating automatically to the screen location and then performing the operation.

The human inspired interaction feature may leverage the capabilities of other features such as runtime screen interpretation and masked output control 155. For instance, runtime screen interpretation may be utilized to interpret and understand elements of a screen. The masked output control 155 feature may control input such as a mouse or keyboard to manipulate screen elements.

In various embodiments, the human inspired interaction may be restricted by masking, location restriction, or the like. The human inspired interaction could be limited to interaction of elements on a screen that are visible and accessible. Thus, the human inspired interaction would not have any more access to an application than a human individual.

At step 1402, the process 1400 may be started on a device. The process 1400 may include a ruleset that determines human inspired interaction ("HII") for the device. The HII may automatically operate various applications on the device to enter or extract data similar to the way a human operator would. At step 1403, an operator initiates the HII App for a certain ruleset. The HII App may run in the background of a device. Based on the ruleset, the HII App may automatically manipulate applications and data on the device. In an exemplary embodiment, the ruleset may be predefined to determine how applications, screen elements, data fields, and the like are modified by the process 1400. At step 1404, the HII App loads the ruleset. The HII App may load a ruleset that is selected by an operator. In an exemplary embodiment, the ruleset may define how the HII App interacts with applications. For example, the ruleset may instruct the HII App to enter personally identifiable information into the data fields of an application. In various embodiments, an operator may choose one of several predefined rulesets for the HII App.

At step 1406, for each instruction in the ruleset, the HII App may perform an operation. The HII App may perform various operations such as starting or stopping an application, navigating the various screens of an application, entering data, and extracting data from an application. In an implementation that combines data restriction with human inspired interaction, the HII App may circumvent the use of human individuals from handling sensitive data. The instructions in each ruleset may be configured to prevent data from being seen by a human operator. In another implementation, the HII App does not have access to data that is masked and only interprets data that is available to a human operator. At step 1408, the HII App loads the necessary application in case the application is not already loaded. In an exemplary embodiment, the HII App may be configured to load one or more applications. The applications, once loaded, may be operated upon by the HII App. At step 1410, the HII App may get application data and screen elements as displayed on the device. In various embodiments, the HII App may retrieve application data by taking an image of a screen. In an exemplary embodiment, application data may retrieve data fields and selectable functions on a screen.

At step 1412, the HII App may send data and elements to the interpreter engine. The interpreter engine may provide the HII App with details of screen elements such as field names, field positions, etc. In an exemplary embodiment, the interpreter engine may be set up in the process shown in FIG. 8. In various embodiments, the interpreter engine may be a machine learned algorithm that has been trained to classify elements on a screen. Examples of machine learned algorithms that may be used to classify screen elements of an application include a random forest and a neural network. At step 1414, the interpreter engine may interpret the various elements. The various elements may be data fields, buttons, or the like. At step 1416, the HII App may process the ruleset to identify interaction details such as buttons/links, inputable screen field elements, or the like. For example, the HII App may identify fields for which data can be entered. The HII App may identify various buttons or links that can be selected by an operator.

At step 1418, the HII App may use an input device, such as a mouse or keyboard, to move the cursor to a screen element such as a field, link, button, or the like. For instance, in an exemplary embodiment, where the ruleset instructs the HII App to navigate to a data entry screen, the HII App may enter cursor and/or keyboard commands to select buttons or links that navigate to the appropriate screen. At step 1420, if the ruleset contains instructions to input data, the HII App will access the dataset provided for input (such as an Excel sheet, flat file, etc.) and input the same in the screen element. For example, the HII App may open an Excel sheet and manipulate one or more data fields. On the other hand, at step 1422, if the ruleset contains instructions to activate a link, button, or the like, the HII App will execute mouse and/or keyboard commands to activate the link, button, or the like. Alternatively, at step 1424, if the ruleset contains instructions to extract data from a screen, the HII App will read the field element, and process according to the ruleset. For example, the HII App may copy a data field from a spreadsheet and transmit the data to a data field of another application. At step 1428, the HII App may check whether there are more rules in the ruleset. If there are more rules, the HII App may go back to step 1406 and step 1408 to process the rules. Alternatively, if there are no more rules or no more data in the dataset, the HII App may stop at step 1430. In various embodiments, the HII App may close one or more applications that were opened in the process 1400.

The disclosed real time data protection and intelligent interaction system 100 may be made or practiced in a variety of embodiments. All of the variety of embodiments are intended to be included within the scope of this disclosure. The language and terminology used in this disclosure should not be construed as restricting the features or aspects of the real time data protection and intelligent interaction system 100. The scope should instead be construed in accordance with the appended claims.

The invention claimed is:

1. A method, comprising:
monitoring a presentation of data by a first application on a display;
determining that a portion of the data is restricted;
updating an identity of one or more users in real time;
   wherein determining that the portion of the data is restricted comprises:
      determining a restriction level for each of the one or more users; and
      updating the portion of the data that is restricted based on a highest restriction level of the one or more users;
masking, in real time, with an operating system, the presentation of the portion of the data that is restricted,
   wherein the masking, in real time, prevents the one or more users interaction with the portion of the data that is restricted,
   wherein unmasked data is provided by an organization to the one or more users,
   wherein determining the unmasked data comprises identifying one or more users that are viewing the portion of the data based on biometric data;
   wherein the masking, in realtime, comprises:
   preventing the one or more users interaction with restricted data provided by the organization while continuing to present the unmasked data on the display, the one or more users being an individual who is restricted from viewing the restricted data,
   wherein the monitoring, determining, and masking in real time are implemented as a layer of the operating system,
   wherein the layer contains one or more application windows that are monitored by a screen parser,
   wherein the screen parser routes the presentation of data to the operating system; and
   wherein the method comprises specifying, by an administrator, a ruleset for determining if the portion of the data is restricted.

2. The method of claim 1, further comprising checking display level interactions to determine that preventing user interaction with the portion of the data that is restricted does not break a functioning of the first application.

3. The method of claim 1, wherein the data is not user-entered data.

4. The method of claim 1, wherein determining that the portion of the data is restricted comprises:
identifying the one or more users that are viewing the portion of the data by collecting biometric data of the one or more users with one or more sensors; and
determining that at least one of the one or more users is restricted from viewing the portion of the data.

5. The method of claim 4, wherein:
identities of the one or more users are updated in real time; and
C comprises:
determining the restriction level for each of the one or more users; and
updating the portion of the data that is restricted based on a highest restriction level of the one or more users.

6. The method of claim 1, wherein determining that the portion of the data is restricted comprises:
   identifying one or more monitoring devices that can view the portion of the data; and
   determining that at least one of the one or more monitoring devices is not authorized to view the portion of the data.

7. The method of claim 1, wherein masking in real time comprises preventing user interaction with restricted data without interfering with the first application's output of unmasked data.

8. The method of claim 1, wherein the method comprises monitoring a presentation of data from a plurality of applications.

9. The method of claim 1, comprising using the screen parser to route the presentation of data to the operating system.

10. The method of claim 9, wherein the screen parser is different from the first application and the operating system.

11. An electronic device comprising:
   a display configured to draw frames containing data elements of an application running within an operating system;
   a processor configured to run the operating system and transmit the frames to the display to be drawn;
   the processor further configured to:
   monitor a presentation of data by the application on a display;
   determine that a portion of the data is restricted;
   update an identity of one or more users in real time;
   wherein determining that the portion of the data is restricted comprises:
   determining a restriction level for each of the one or more users; and
   updating the portion of the data that is restricted based on a highest restriction level of the one or more users;
   mask, in real time, with an operating system, the presentation of the portion of the data that is restricted,
   wherein the masking, in real time, prevents the one or more users interaction with the portion of the data that is restricted,
   wherein unmasked data is provided by an organization to the one or more users,
   wherein determining the unmasked presentation of data comprises identifying one or more users that are viewing the portion of the data based on biometric data;
   wherein the masking, in real time, comprises:
   preventing the one or more users interaction with restricted data provided by the organization while continuing to present the unmasked data on the display, the one or more users being an individual who is restricted from viewing the restricted data,
   wherein the monitoring, determining, and masking in real time are implemented as a layer of the operating system,
   wherein the layer contains one or more application windows that are monitored by a screen parser,
   wherein the screen parser routes the presentation of data to the operating system; and
   wherein the method comprises specifying, by an administrator, a ruleset for determining if the portion of the data is restricted.

12. The electronic device of claim 11, wherein the processor is further configured to nullify user actions that target the portion of the data that is restricted; and
   wherein the processor is further configured to check display level interactions to determine whether user actions, which target the portion of the data and are nullified, do not break a functioning of the application.

13. The electronic device of claim 11, further comprising:
   one or more sensors that collect image data;
   wherein the processor is further configured to:
   identify one or more monitoring devices that can view the portion of the data; and
   determine that at least one of the one or more monitoring devices is not authorized to view the portion of the data.

14. The electronic device of claim 11, wherein the processor is further configured to allow the application to function normally while the portion of the data is masked.

15. The electronic device of claim 11, further comprising:
   one or more sensors that collect the biometric data;
   wherein the processor is further configured to:
   identify the one or more users that are viewing the portion of the data based on the biometric data; and
   determine that at least one of the one or more users is restricted from viewing the portion of the data.

16. The electronic device of claim 15, wherein:
   identities of the one or more users are updated in real time; and
   wherein the processor is further configured to:
   determine a restriction level for each of the one or more users; and
   update the portion of the data that is restricted based on a highest restriction level of the one or more users.

17. The electronic device of claim 11, wherein the processor is configured to mask, in real time, with the operating system while continuing to present the unmasked data on the display with the application.

* * * * *